United States Patent
Li

(10) Patent No.: US 11,856,537 B2
(45) Date of Patent: Dec. 26, 2023

(54) METHOD, APPARATUS, VEHICLE-MOUNTED DEVICE AND TERMINAL FOR TRANSMITTING AND RECEIVING REFERENCE SIGNAL

(71) Applicant: BEIJING XIAOMI MOBILE SOFTWARE CO., LTD., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 437 days.

(21) Appl. No.: 17/267,021

(22) PCT Filed: Aug. 10, 2018

(86) PCT No.: PCT/CN2018/100064
§ 371 (c)(1),
(2) Date: Feb. 9, 2021

(87) PCT Pub. No.: WO2020/029283
PCT Pub. Date: Feb. 13, 2020

(65) Prior Publication Data
US 2021/0235404 A1   Jul. 29, 2021

(51) Int. Cl.
H04W 56/00 (2009.01)
H04W 4/40 (2018.01)
(Continued)

(52) U.S. Cl.
CPC ......... *H04W 56/001* (2013.01); *H04L 5/0048* (2013.01); *H04W 4/40* (2018.02); *H04W 72/044* (2013.01)

(58) Field of Classification Search
CPC ... H04W 56/001; H04W 4/40; H04W 72/044; H04W 56/0015; H04W 72/0446;
(Continued)

(56) References Cited

U.S. PATENT DOCUMENTS

2012/0307870 A1   12/2012   Hakola et al.
2017/0041894 A1   2/2017   Lee
(Continued)

FOREIGN PATENT DOCUMENTS

CN   105474712 A   4/2016
CN   107046461 A   8/2017
(Continued)

OTHER PUBLICATIONS

Samsung R1-1705318: SS block composition, SS burst set composition and SS time index Apr. 2017 (Year: 2017).*
Extended European Search Report in the European Application No. 18929599.1, dated Jul. 9, 2021, (10p).
First Office Action of the Russian Application No. 2021105876, dated Aug. 3, 2021, (14p).
(Continued)

*Primary Examiner* — Rina C Pancholi
(74) *Attorney, Agent, or Firm* — Arch & Lake LLP

(57) ABSTRACT

Provided are a method and apparatus for sending a reference signal, a method and apparatus for receiving a reference signal, and a vehicle user equipment (UE) and a terminal. The method for sending a reference signal comprises: determining transmission configuration information of synchronization signal blocks (VSSBs) in an NR V2X system, wherein the transmission configuration information comprises: a sending period of the VSSBs and a time-domain position of a VSSB sending time window within the sending period; and according to the transmission configuration information; sending the N VSSBs in the periodically appearing VSSB sending time window, wherein N is an integer greater than or equal to one; and each of the VSSBs comprises: a primary sidelink synchronization signal (PSSS), a secondary sidelink synchronization signal (SSSS), a physical sidelink broadcast channel (PSBCH) and a demodulation reference signal (DMRS).

17 Claims, 15 Drawing Sheets

(51) Int. Cl.
*H04L 5/00* (2006.01)
*H04W 72/044* (2023.01)

(58) Field of Classification Search
CPC ............ H04W 72/0453; H04L 5/0048; H04L 27/26025; H04L 27/2613; H04L 27/2666; H04L 5/0051; H04L 5/0053; H04L 5/0007; H04L 5/0023; H04L 5/001; H04L 5/0092; H04B 7/0408; H04B 7/0695; H04B 7/2041
See application file for complete search history.

(56) References Cited

U.S. PATENT DOCUMENTS

| | | | |
|---|---|---|---|
| 2017/0188391 A1 | 6/2017 | Rajagopal et al. | |
| 2018/0048446 A1 | 2/2018 | Jiang | |
| 2018/0084593 A1* | 3/2018 | Chen | H04L 5/0048 |
| 2018/0198659 A1 | 7/2018 | Ko | |
| 2018/0302202 A1* | 10/2018 | Kim | H04L 5/0051 |
| 2019/0045465 A1* | 2/2019 | Lee | H04W 92/18 |
| 2019/0327123 A1* | 10/2019 | Wang | H04L 27/26 |
| 2020/0213961 A1* | 7/2020 | Lee | H04W 56/001 |
| 2021/0168574 A1* | 6/2021 | Zhang | H04W 8/005 |

FOREIGN PATENT DOCUMENTS

| | | |
|---|---|---|
| CN | 108141340 A | 6/2018 |
| CN | 108282859 A | 7/2018 |
| CN | 108282862 A | 7/2018 |
| RU | 2649874 C1 | 4/2018 |
| WO | 2020033086 A1 | 2/2020 |

OTHER PUBLICATIONS

Samsung: "SS Block Composition, SS Burst Set Composition and SS Time Index Indication", 3GPP TSG RAN WG1 #88bis, R1-1705318, Spokane, WA Apr. 3-7, 2017, (12p).

Jin Liu, et al.: "Initial Access, Mobility, and User-Centric Multi-Beam Operation in 5G New Radio", IEEE Communications Magazine., vol. 56, No. 3, Mar. 1, 2018, (7p).

First Office Action of the Chinese Application No. 202111187473.3, dated Apr. 19, 2022 with English translation, (16p).

International Search Report of PCT Application No. PCT/CN2018/100064 dated Apr. 16, 2019 with English translation (4p).

Notice of Allowance of the Chinese application No. 201880001757.9, dated Jul. 29, 2021, (4 pages).

"3rd Generation Partnership Project; Technical Specification Group Radio Access Network; Evolved Universal Terrestrial Radio Access (E-UTRA); User Equipment (UE) conformance specification; Radio transmission and reception; Part 1: Conformance Testing (Release 15)", 3GPP TS 36.521-1 V15.2.0 (Jun. 2018), p. 119-120, 678, (5 pages).

First Office Action of the Japanese application No. 2021-506940, dated Apr. 6, 2022, (14 pages).

RAN4, "Reply LS on subcarrier spacing and carrier frequencies", 3GPP TSG-RAN WG4 Meeting #82 R4-1702019, Athens, Greece, Feb. 13-17, 2017.

Second Office Action of the Chinese Application No. 202111187473.3, dated Oct. 8, 2022.

English Translation of the Written Opinion of the International Search Authority in the International Application No. PCT/CN2018/100064, dated Apr. 16, 2019 (4p).

\* cited by examiner

METHOD, APPARATUS, VEHICLE-MOUNTED DEVICE AND TERMINAL FOR TRANSMITTING AND RECEIVING REFERENCE SIGNAL

CROSS-REFERENCE TO RELATED APPLICATION

This application is the national phase application of International Application No. PCT/CN2018/100064 filed on Aug. 10, 2018, the entire content of which is hereby incorporated by reference in its entirety for all purposes.

TECHNICAL FIELD

The present disclosure generally relates to the field of communication technology, and more particularly, to a method, apparatus, vehicle-mounted device and terminal for transmitting and receiving a reference signal.

BACKGROUND

In Long Term Evolution Vehicle-to-Everything (LTE V2X) technology, for example, in the Vehicle-to-Vehicle (V2V) communication application scenario, due to a possibility of two vehicles meeting, a relative speed becomes almost twice of a speed of a single vehicle, which makes a Doppler frequency shift become larger. In order to combat a larger Doppler frequency shift value, in a subframe of 1 ms, both of a Primary Sidelink Synchronization Signal (PSSS) and a Secondary Sidelink Synchronization Signal (SSSS) of V2X occupy two symbols, and a Physical Sidelink Broadcast CHannel (PSBCH) occupies 5 symbols. And 3 symbols for a DeModulation Reference Signal (DMRS) are transmitted in the middle time division, which is used to demodulate the PSBCH. In addition, the subframe of 1 ms contains two slots, and each slot occupied 7 symbols. Within these 14 symbols, a first symbol is used for Automatic Gain Control (AGC), that is, for a device receiving PSSS/SSSS/PSBCH to adjust a power gain; and a last symbol is used to combat a transmission and reception delay caused by devices in different locations. And a transmitting cycle of the synchronization signal and the broadcast channel is 160 ms, that is, 1 ms within every 160 ms is used to transmit one synchronization signal and a frame structure of the broadcast channel. Moreover, since LTE sidelink applies the features similar to LTE uplink, and the LTE uplink applies Single-Carrier Frequency-Division Multiple Access (SC-FDMA), thus, the DMRS and the PSBCH are transmitted on different symbols.

In a New Radio (NR) access technology spectrum, each slot includes 14 symbols, and a subcarrier spacing determines how many slots are contained within 1 millisecond (ms). For example, when the subcarrier spacing is 15 kilohertz (KHz), there is 1 slot in 1 ms; when the subcarrier spacing is 30 KHz, there are 2 slots in 1 ms; and when the subcarrier spacing is 60 KHz, there are 4 slots in 1 ms, and so on.

In the NR, in order to reduce the always-on reference signal and thereby reduce the overhead, a Synchronization Signal Block (SSB) is proposed. Each SSB occupies 4 consecutive symbols, which respectively in order are a Primary Synchronization Signal (PSS), a Physical Broadcast CHannel (PBCH), a Secondary Synchronization Signal (SSS) and a Physical Broadcast CHannel (PBCH). Among them, 12 resource blocks (RBs) located in the middle of these symbols are SSS, 4 RBs located on both sides are PBCH, and some subcarriers in the PBCH are DeModulation Reference Signals (DMRS). The subcarrier spacing of the synchronization signal block can be 15 KHz, 30 KHz, 120 KHz or 240 KHz, and all synchronization signal blocks are transmitted within 5 ms. In order to support beam transmission, when there are one or multiple beams, each beam needs to transmit the SSB, thus a maximum number of synchronization signal blocks that can be transmitted within 5 ms is 4 (when the carrier frequency is below 3 GHz) or 8 (when the carrier frequency is 3 GHz-6 GHz) or 64 (when the carrier frequency is above 6 GHz), and multiple SSBs within 5 ms are called Synchronous Signal Block set (SSB burst set). A transmitting cycle of the SSB burst set can be 5 ms, 10 ms, 20 ms, 40 ms, etc.

In the 5th Generation (5G) NR system, the V2X technology is also introduced, but the transmission of the synchronization signal and the broadcast channel have not yet been defined.

SUMMARY

The present disclosure provides a method, apparatus, vehicle-mounted device and terminal for transmitting and receiving a reference signal.

According to a first aspect of the present disclosure, there is provided a method for transmitting a reference signal, the method including: determining transmission configuration information of a vehicle synchronization signal block (VSSB) in a new radio (NR) vehicle-to-everything (V2X) system, wherein the transmission configuration information comprises: a transmitting cycle of the VSSB, and a time domain position of a VSSB transmitting time window in the transmitting cycle; and transmitting N VSSBs in the VSSB transmitting time window that occurs periodically, according to the transmission configuration information, wherein N is an integer greater than or equal to 1; wherein each of the VSSBs comprises: a primary sidelink synchronization signal (PSSS), a secondary sidelink synchronization signal (SSSS), a physical sidelink broadcast channel (PSBCH) signal, and a demodulation reference signal (DMRS).

According to a second aspect of the present disclosure, a method for receiving a reference signal is provided, and the method includes: detecting a vehicle synchronization signal block (VSSB) in a new radio (NR) vehicle-to-everything (V2X) system transmitted by a vehicle user equipment (UE); acquiring VSSB index information from the detected target VSSB; determining a time domain location corresponding to the target VSSB according to the VSSB index information; and performing time domain synchronization with the vehicle UE according to the time domain location.

According to a third aspect of the present disclosure, a vehicle user equipment (UE) is provided, and the vehicle UE includes: a processor; a memory storing a computer program executable by the processor; wherein the processor is configured to: determine transmission configuration information of a vehicle synchronization signal block (VSSB) in a new radio (NR) vehicle-to-everything (V2X) system, wherein the transmission configuration information comprises: a transmitting cycle of the VSSB, and a time domain position of a VSSB transmitting time window in the transmitting cycle; and transmit N VSSBs in the VSSB transmitting time window that occurs periodically, according to the transmission configuration information, wherein N is an integer greater than or equal to 1; wherein each of the VSSBs comprises: a primary sidelink synchronization signal (PSSS), a secondary sidelink synchronization signal (SSSS), a physical sidelink broadcast channel (PSBCH) signal, and a demodulation reference signal (DMRS).

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples illustrated in the accompanying drawings. The following description refers to the accompanying drawings in which the same reference numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

The terms used in the present disclosure are only for the purpose of describing specific examples, and are not intended to limit the present disclosure. The singular forms "a/an", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms of "first", "second", "third", etc. may be used in this disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "when" or "in response to that" or "in response to certainty".

Figure 1:
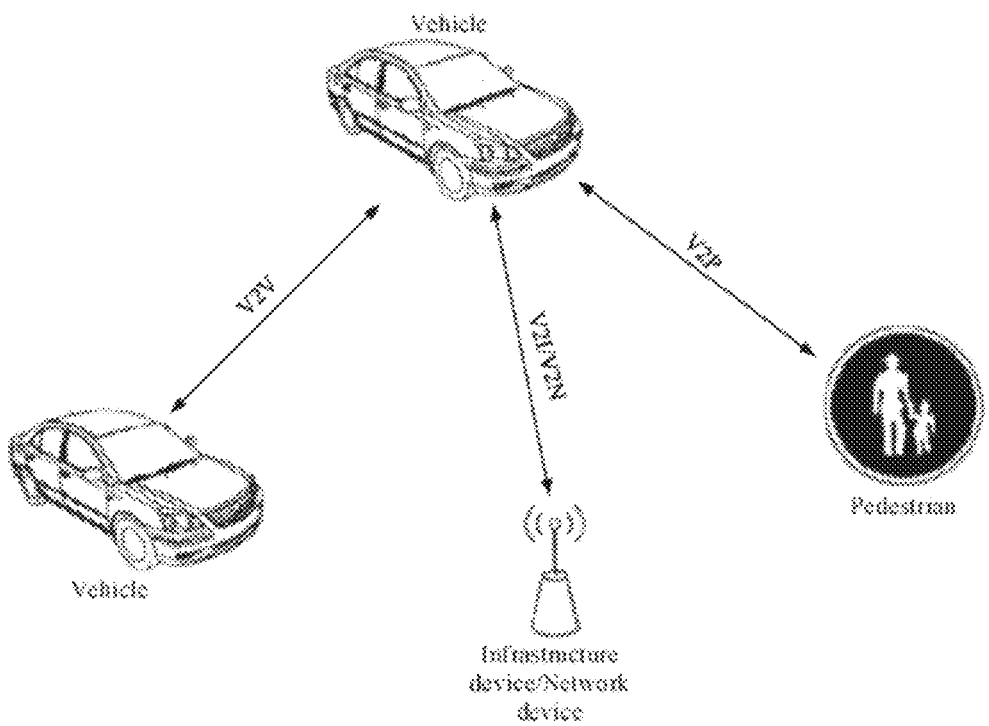
FIG. 1 is a schematic diagram of an application scenario of an NR V2X system according to an example of the present disclosure.

The executive bodies involved in the present disclosure include: a vehicle UE and a receiving terminal in the NR V2X system. Herein, referring to the application scenario shown in FIG. 1 according to an example of the present disclosure, the V2X communication includes: Vehicle-to-Vehicle (V2V) communication, Vehicle to Infrastructure (V2I, vehicle-to-roadside unit) communication, Vehicle to Nomadic Device (V2N) communication, Vehicle to Pedestrian (V2P) communication representing the communication between the vehicle and the terminal of the pedestrian. Herein, the aforementioned receiving terminal may be a vehicle, a roadside infrastructure device, and a pedestrian's mobile terminal. In a specific implementation process, the vehicle UE and the receiving terminal may be independent of each other and may also communicate with each other to jointly implement the technical solution provided by the present disclosure.

Based on the above application scenario, the present disclosure provides a method for transmitting a reference signal, which is suitable for a vehicle UE to communicate with a receiving terminal through a Side Link based on preset time frequency domain resources configured by a base station in the 5G NR system. Herein, the foregoing preset resources include uplink time domain resources and/or blank resources.

Figure 2:
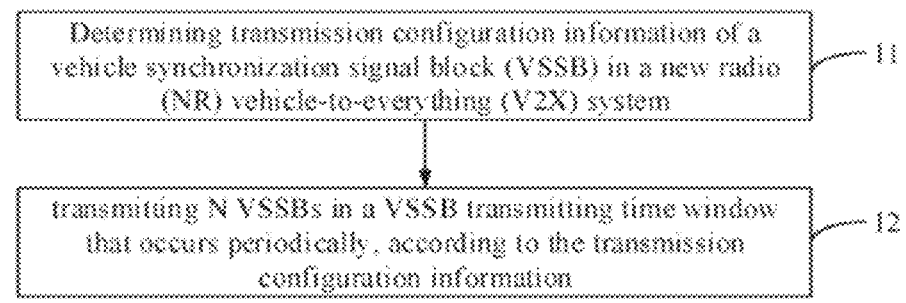
FIG. 2 is a flow chart of a method for transmitting a reference signal according to an example of the present disclosure.

Referring to FIG. 2, FIG. 2 shows a flow chart of a method for transmitting a reference signal according to an example of the present disclosure, which is applied in a vehicle UE. The method includes the following steps.

In step 11, transmission configuration information of a Vehicle Synchronization Signal Block (VSSB) in a New Radio (NR) Vehicle-to-Everything (V2X) system is determined, where the transmission configuration information includes: a transmitting cycle of the VSSB and a time domain position of a VSSB transmitting time window in the transmitting cycle In the present disclosure, the Synchronization Signal Block (SSB) used in NR V2X system is referred to as a VSSB. Herein, each of the VSSBs includes: a Primary Sidelink Synchronization Signal (PSSS), a Secondary Sidelink Synchronization Signal (SSSS), a Physical Sidelink Broadcast CHannel (PSBCH) signal, and a DeModulation Reference Signal (DMRS).

In step 12, N VSSBs are transmitted in the VSSB transmitting time window that occurs periodically according to the transmission configuration information, where N is an integer greater than or equal to 1.

Assuming that the transmitting cycle of the aforementioned VSSB is 160 ms, a VSSB transmitting time window is set at a fixed position in each transmitting cycle in the present disclosure. For example, if the transmission window with a duration of 5 ms is set at a time point of 50 ms during the 160 ms, the position of the VSSB transmitting time window in the VSSB transmitting cycle can be expressed as the 50 ms 54 ms.

In the present disclosure, when a VSSB transmitting time window arrives, the vehicle UE transmits N VSSBs through wave speed.

Figure 3:
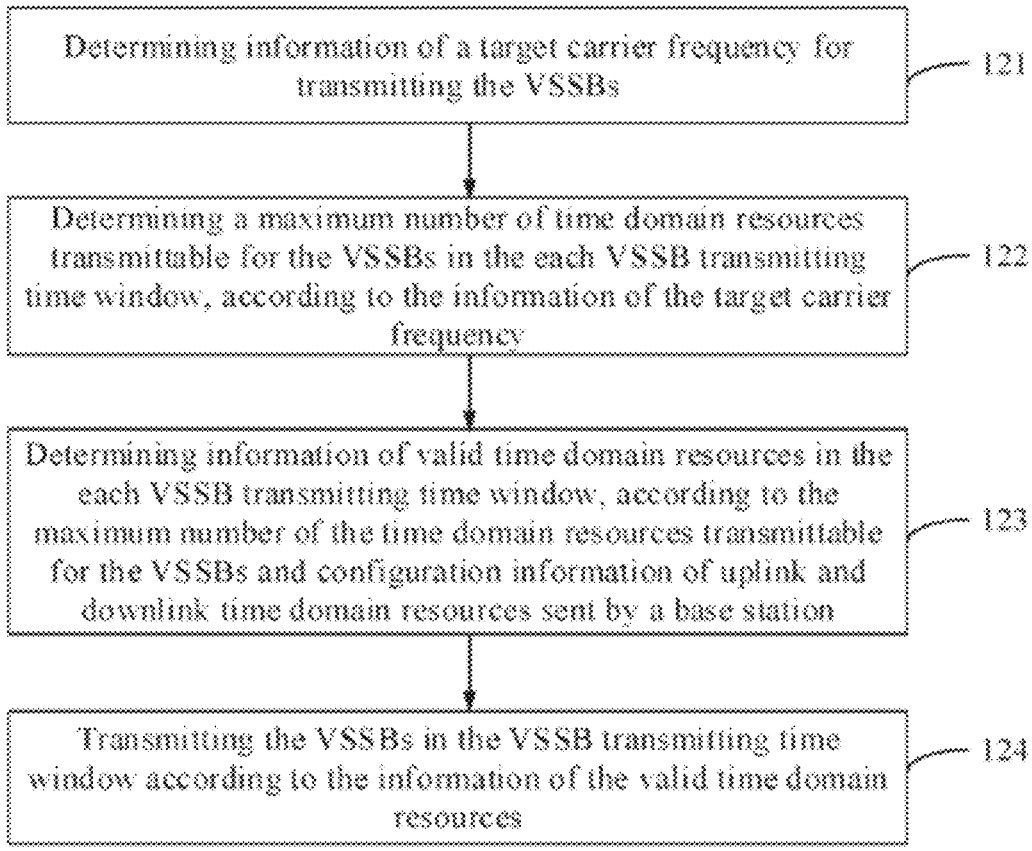
FIG. 3 is a flow chart of another method for transmitting a reference signal according to an example of the present disclosure.

Referring to FIG. 3, FIG. 3 shows a flow chart of another method for transmitting a reference signal according to an example of the present disclosure, the above step 12 may include the following step.

In step 121, information of a target carrier frequency for transmitting the VSSBs is determined;

herein, the information of the target carrier frequency includes: the frequency band and bandwidth of the VSSB transmission carrier frequency.

In the present disclosure, the information of the target carrier frequency for transmitting the VSSBs is determined by the vehicle UE in one of the following manners.

Manner 1: the information of the target carrier frequency is determined according to preset resource configuration information.

For example, the chip of the vehicle UE is preset with an indication of the carrier frequency information for the VSSB transmission, and the vehicle UE can directly read the information of the target carrier frequency from the chip.

Manner 2: the information of the target carrier frequency is determined according to the resource configuration information issued by a base station.

Figure 4:
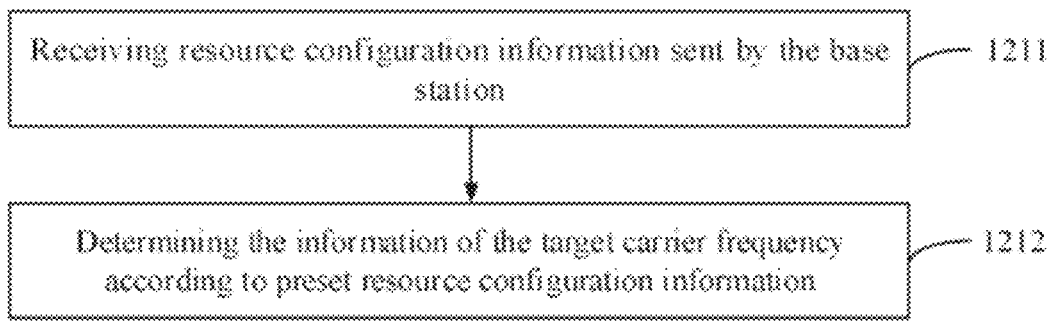
FIG. 4 is a flow chart of another method for transmitting a reference signal according to an example of the present disclosure.

Referring to FIG. 4, FIG. 4 shows a flow chart of another method for transmitting a reference signal according to an example of the present disclosure, the above step 121 may include the following steps.

In step 1211, resource configuration information sent by the base station is received, where the resource configuration information is configured to inform the vehicle UE to transmit the VSSBs with configured resources.

As mentioned above, the transmission of VSSBs in the disclosure is performed by using a preset resource configured by the base station. In an example, the resource block configured by the base station for the vehicle UE may be at the same carrier frequency as the resource used by the base station, and thus the above resource configuration information may only indicate location information of Resource Block (RB), instead of indicating the information of the carrier frequency band.

If the resource block configured by the base station for the vehicle UE and the resource used by the base station are at different carrier frequencies, the above resource configuration information needs to indicate the information of the carrier frequency band and the location information of the resource block.

In step 1212, the information of the target carrier frequency is determined according to the resource configuration information.

Correspondingly, if the vehicle UE acquires only the location information of the resource block from the above resource configuration information, the current operating carrier frequency for communicating with the base station is determined as the target carrier frequency for the VSSB transmission, according to the protocol.

In another example, the vehicle UE determines the target carrier frequency according to the information of the carrier frequency band informed by the base station.

In step 122, a maximum number of time domain resources transmittable for the VSSBs in the VSSB transmitting time window is determined according to the information of the target carrier frequency.

In an example of the present disclosure, the system can specify different maximum numbers Nmax of the time domain resources transmittable for the VSSBs in a transmitting time window corresponding to different carrier frequency bands.

In the vehicle UE, a preset list can be used to record the correspondence between the information of the carrier frequency band f and the maximum number Nmax of the time domain resources transmittable for the VSSBs in a transmitting time window. For example, the foregoing preset list may be as shown in Table. 1:

TABLE 1

| Information of carrier frequency band (GHz) | Nmax |
|---|---|
| f > M | 64 |
| L < f ≤ M | 32 |
| Z < f ≤ L | 16 |
| Y < f ≤ Z | 8 |
| X ≤ f ≤ Y | 4 |
| f < X | 2 |

After the vehicle UE determines the target carrier frequency for the VSSB transmission, the maximum number of the time domain resources transmittable for the VSSBs (i.e. Nmax) corresponding to the target carrier frequency can be determined by querying Table 1.

In step 123, information of valid time domain resources in the VSSB transmitting time window is determined according to the maximum number of the time domain resources transmittable for the VSSBs and configuration information of uplink and downlink time domain resources sent by a base station.

In the present disclosure, part of the time domain resources in one VSSB transmitting time window that arrives periodically, may be configured by the base station as unavailable resources for the VSSB transmission, such as the downlink time domain resources. Therefore, the vehicle UE needs to accurately determine the information of the valid time domain resources that can be used to transmit the VSSBs in the VSSB transmitting time window, according to the Nmax and the configuration information of the uplink and downlink time domain resources sent by the base station.

Figure 5:
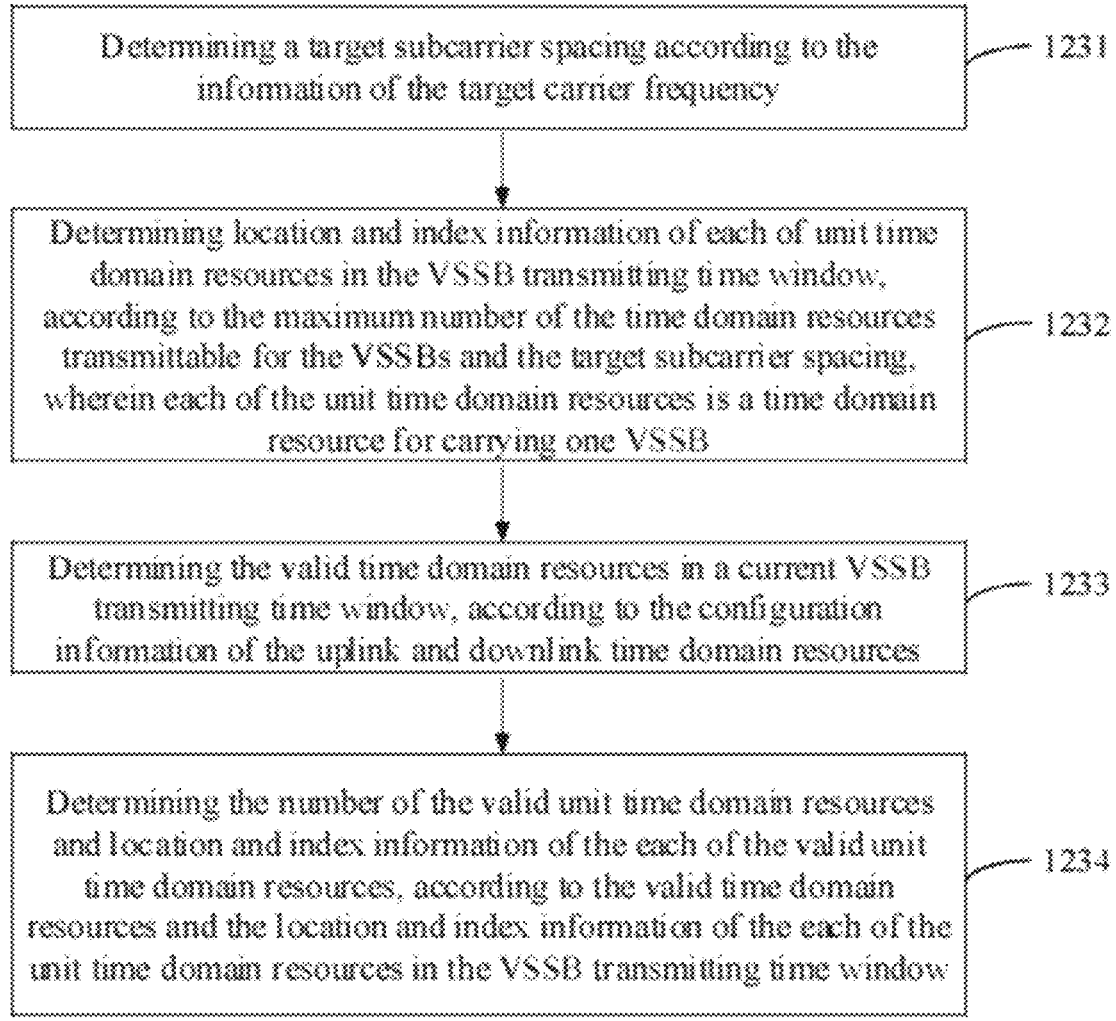
FIG. 5 is a flow chart of another method for transmitting a reference signal according to an example of the present disclosure.

Referring to FIG. 5, FIG. 5 shows a flow chart of another method for transmitting a reference signal according to an example of the present disclosure, step 123 may include the following steps.

In step 1231, a target subcarrier spacing is determined according to the information of the target carrier frequency.

In the NR V2X system, a carrier frequency may correspond to multiple available subcarrier spacings. For example, in the frequency band below 6 GHz, the subcarrier spacings that can be used by the system to transmit the VSSBs, include: 15 KHz, 30 KHz, and 60 KHz. In frequency bands above 6 GHz, the subcarrier spacings that can be used by the system to transmit the VSSBs, include: 120 KHz, 240 KHz and 480 KHz. The higher the frequency band of the target carrier frequency of the vehicle UE belongs to, the larger the subcarrier spacing is used to transmit the VSSBs. The vehicle UE can determine the target subcarrier spacing according to the current vehicle speed. For example, when the vehicle speed exceeds a preset threshold, a larger subcarrier spacing is used to combat Doppler shift.

In step 1232, location and index information of each of unit time domain resources in the VSSB transmitting time window is determined according to the maximum number of the time domain resources transmittable for the VSSBs and the target subcarrier spacing. Herein, each of the unit time domain resources is a time domain resource for carrying one VSSB.

For example, assuming that the target carrier frequency of the vehicle UE belongs to the frequency band of 3 GHz, and the determined target subcarrier spacing is 15 KHz, then one slot is contained in 1 ms. Assuming that the VSSB transmitting time window is 5 ms, the VSSB transmitting time window includes 5 slots, and the slots may be numbered as: 0, 1, 2, 3, 4.

Figure 6A:
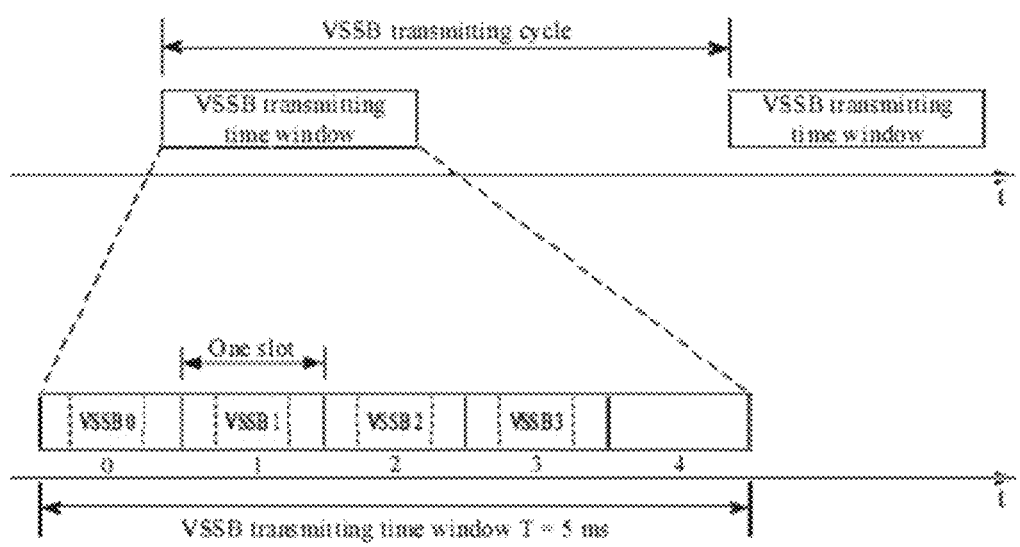
FIG. 6A is a schematic diagram of an application scenario for transmitting a reference signal according to an example of the present disclosure.

If the system specifies the frequency band of 3 GHz, one unit time domain resources is set in one slot. Assuming that the determined maximum number Nmax of the time domain resources transmittable for the VSSBs in the above step 122 is 4, the location and index information of each unit time domain resources in the VSSB transmitting time window may be as shown in FIG. 6A, where the four of VSSB index information are: VSSB0, VSSB1, VSSB2, and VSSB3.

Figure 6B:
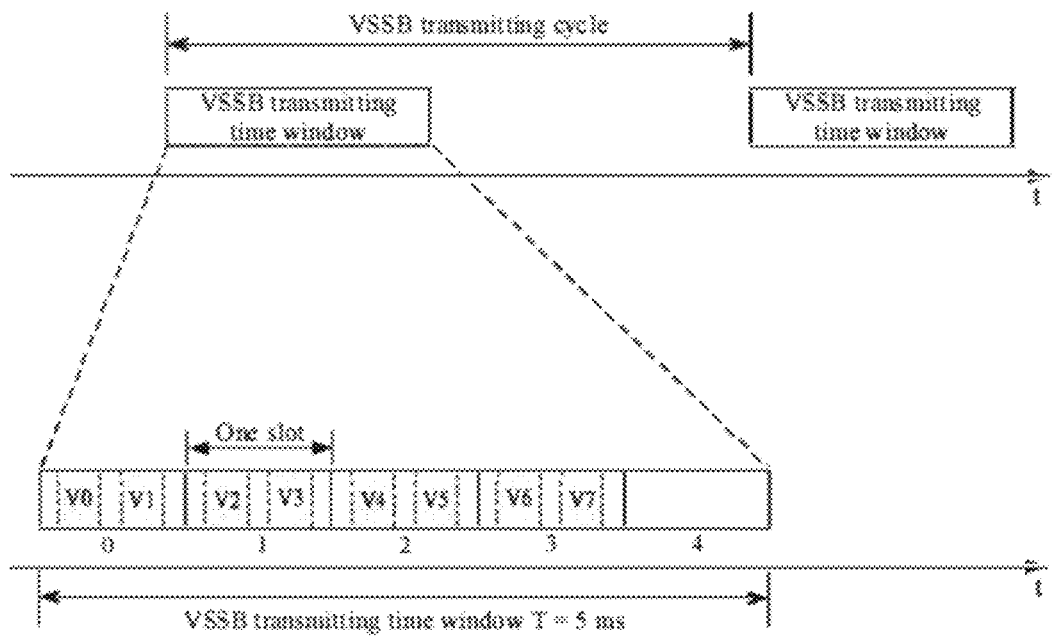
FIG. 6B is a schematic diagram of another application scenario for transmitting a reference signal according to an example of the present disclosure.

In another example, assuming that the target carrier frequency of the vehicle UE belongs to the frequency band of 6 GHz, the determined maximum number Nmax of the time domain resources transmittable for the VSSBs in the above step 122 is 8. If the protocol specifies the frequency band of 6 GHz, and the subcarrier spacing of 15 KHz, two unit time domain resources will be set in each slot. As shown in FIG. 6B, the location and index information of the unit time domain resources in the VSSB transmitting time window are: V0~V7.

In step 1233, the valid time domain resources in a current VSSB transmitting time window are determined according to the configuration information of the uplink and downlink time domain resources. Herein, the valid time domain resources include uplink time domain resources and/or blank resources configured by the base station. Herein, the blank resources are flexible resources, that is, the current base station has not determined whether this time domain resource is used for the uplink transmission or the downlink transmission. As long as it has not been determined to be configured as a downlink time domain resource, it is a valid time domain resource.

In the present disclosure, if the system specifies that the time domain resources in the VSSB transmitting time window are configured as the uplink resources or the blank resources, they can be used for the VSSB transmission.

Still as shown in FIG. 6A, in one example, if the slots in which the unit time domain resources are located (that is, slots #0~3), are all configured as the uplink time domain resources or partially configured as a blank resources by the base station, then the slots #0~3 are the valid time domain resources for current VSSB transmission.

In another example of the present disclosure, if it is determined, according to the configuration information of the uplink and downlink time domain resources, that the slot #1 in the VSSB transmitting time window is configured as the downlink time domain resource, then the valid time domain resources in the current VSSB transmitting time window are slots #0, 2 and 3.

In step 1234, the number of the valid unit time domain resources and location and index information of each of the valid unit time domain resources are determined according to the valid time domain resources and the location and index information of each of the unit time domain resources in the VSSB transmitting time window.

In the present disclosure, according to the system specification, when the information of the target carrier frequency and the subcarrier spacing are determined, the index information of the unit time domain resources corresponding to the VSSB transmitting time window is preset. As shown in FIG. 6A, according to the system specification, when the frequency band is 3 GHz and the subcarrier spacing is 15 KHz, the index information of the unit time domain resources corresponding to the VSSB transmitting time window may be: VSSB0, VSSB1, VSSB2 and VSSB3.

If the slot #1 is configured as the downlink resource, the number of the valid unit time domain resources currently available for VSSB transmission is 3, namely: VSSB0 in slot 0, VSSB2 in slot 2, and VSSB3 in slot 3. The range of symbols occupied by each VSSB in a slot can be specified by the system, for example: symbols #2~#6.

In the above example, the number of valid unit time domain resources and the location and index information of each of the valid unit time domain resources determined by the vehicle UE may be shown in Table 2:

TABLE 2

| | |
|---|---|
| Number of valid unit time domain resources | 3 |
| Location information of valid unit time domain resources | VSSB0, VSSB2, VSSB3 |
| Index information of valid unit time domain resources | Symbols #2~#6 in slot 0<br>Symbols #2~#6 in slot 2<br>Symbols #2~#6 in slot 3 |

In step 124, the VSSBs in the VSSB transmitting time window are transmitted according to the information of the valid time domain resources.

In the present disclosure, the vehicle UE can use the valid time domain resources in the current VSSB transmitting time window to transmit the VSSBs to the receiving terminal.

Figure 7:
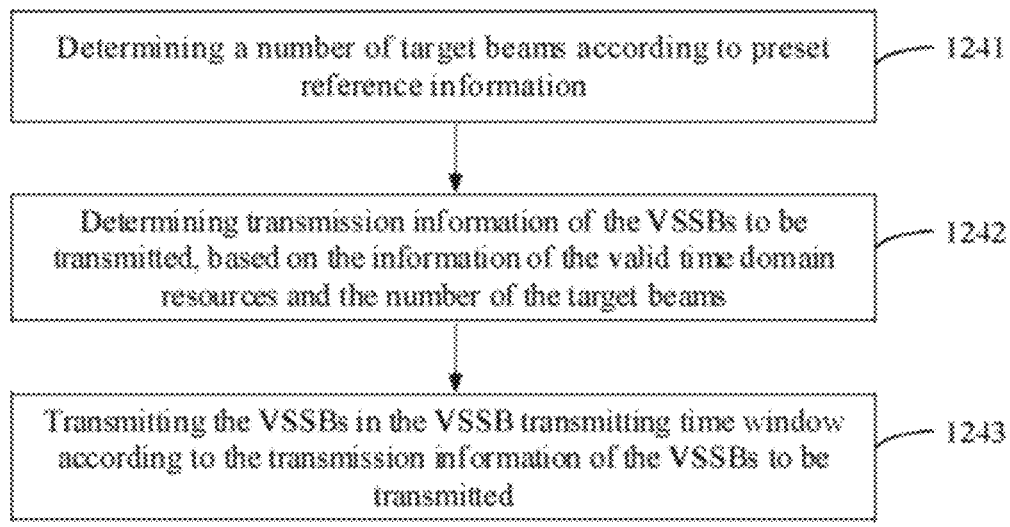
FIG. 7 is a flow chart of another method for transmitting a reference signal according to an example of the present disclosure.

Referring to FIG. 7, FIG. 7 shows a flow chart of another method for transmitting a reference signal according to an example of the present disclosure, the above step 124 may include the following steps.

In step 1241, a number of target beams are determined according to preset reference information, where the preset reference information is configured to determine a number of beams for transmitting the VSSBs in a current context. Herein, each of the beams is configured to transmit at least one of the VSSBs in a respective preset direction, and the number of the target beams is less than or equal to the maximum number of the time domain resources transmittable for the VSSBs.

In the present disclosure, after the vehicle UE determines the maximum number Nmax of the time domain resources transmittable for the VSSBs according to the target frequency band information, assuming Nmax=8, in general, 8 beams are to be used to transmit VSSBs in different directions. Herein, one beam is used to transmit at least one of the VSSBs in a preset direction. That is, in general, the number of beams for transmitting VSSBs is equal to the maximum number of the time domain resources transmittable for the VSSBs.

In an example of the present disclosure, in order to save power consumption, the vehicle UE can also determine the actual number of beams to be transmitted based on the preset reference information, such as the number and distribution of surrounding receiving terminals, and topography information of the current geographic location.

For example, in the V2V system, if the vehicle UE is currently traveling along a mountain road, and one side of the vehicle UE is close to the mountain, the vehicle UE does not need to transmit the VSSBs to the mountain. In this way, the number of beams to be transmitted can be reduced to, for example, 4.

In step 1242, transmission information of the VSSBs to be transmitted is determined based on the information of the valid time domain resources and the number of the target beams. Herein, the transmission information of the VSSBs to be transmitted includes: an actual number of the VSSBs to be transmitted, and a location and index information of each of valid unit time domain resources occupied by each of the VSSBs to be transmitted.

After determining the number of the target beams, the vehicle UE may determine the actual number of the VSSBs to be transmitted based on the information of the valid time domain resources and the number of the target beams, which may include the following two situations.

In situation 1, if the number of the target beams is larger than or equal to the number of the valid time domain resources, the number of the valid time domain resources is determined as the actual number of the VSSBs to be transmitted.

Figure 8A:
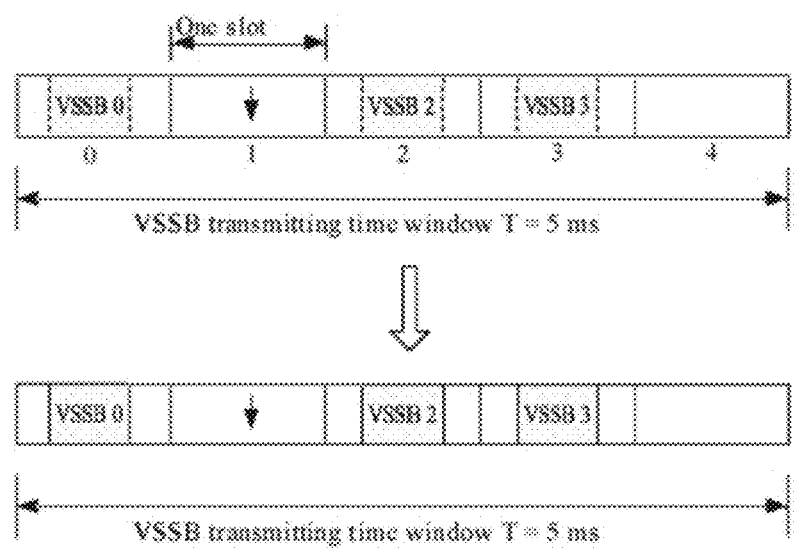
FIG. 8A is a schematic diagram of an application scenario for transmitting a reference signal according to an example of the present disclosure.

For example, as shown in FIG. 8A, when the slot 1 in the VSSB transmitting time window shown in FIG. 6A is configured as the downlink resource, the number of valid unit time domain resources in the VSSB transmitting time window is equal to 3, which is less than the aforementioned number 4 of the target beams, and the vehicle UE determines that the number of the VSSBs to be transmitted is 3.

In situation 2, if the number of the target beams is less than or equal to the number of the valid time domain resources, the number of the target beams is determined as the actual number of the VSSBs to be transmitted.

Figure 8B:
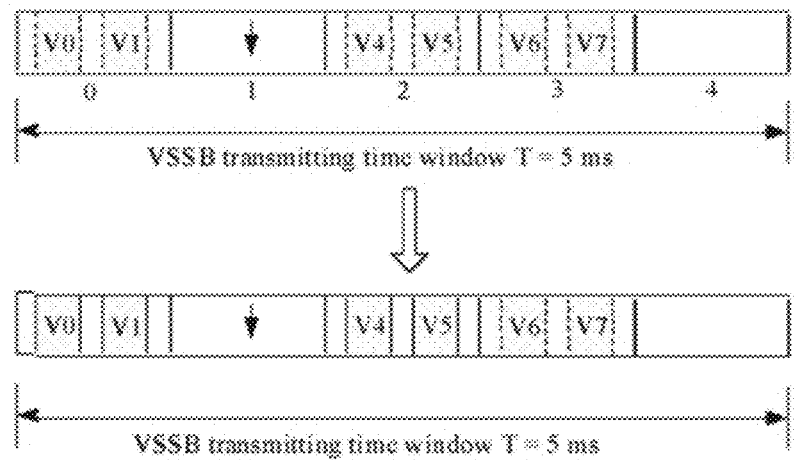
FIG. 8B is a schematic diagram of another application scenario for transmitting a reference signal according to an example of the present disclosure.

For example, as shown in FIG. 8B, when the slot 1 in the VSSB transmitting time window shown in FIG. 6B is configured as the downlink resource, the number of valid unit time domain resources is equal to 6, which is larger than the aforementioned number 4 of the target beams, and the number of the VSSBs to be transmitted is determined as 4.

After the actual number of the VSSBs to be transmitted is determined, the location and index information of each of the valid unit time resources occupied by each VSSB to be transmitted is determined according to the location and index information of the valid unit time domain resources determined in the above step 1234. As shown in FIG. 8A, the valid unit time domain resources corresponding to the index information of VSSB0, VSSB2, and VSSB3 are used to transmit the VSSBs.

In another example of the present disclosure, when the number of the valid unit time domain resources is larger than the number of the VSSBs to be transmitted, as shown in FIG. 8B, the number of VSSBs to be transmitted is equal to 4, and the number of the valid unit time domain resources is equal to 6. Then, the vehicle UE can randomly select four of the above six valid unit time domain resources (V0, V1, V4, V5, V6, V7) for the VSSB transmission. For example, the transmission can be performed at the corresponding locations of V0, V1, V4 and V5, or at the locations of V0, V1, V6, and V7, or at the locations of V4, V5, V6, and V7, or at four discontinuous locations. The present disclosure does not limit this.

In step 1243, the VSSBs in the VSSB transmitting time window are transmitted according to the transmission information of the VSSBs to be transmitted.

FIG. 8A shows the schematic diagram of the VSSB transmission in response to that there are 3 VSSBs to be transmitted and the number of the valid unit time domain resources is also equal to 3. That is, the three VSSBs are transmitted at the locations where the index information includes VSSB0, VSSB2, and VSSB3 respectively.

FIG. 8B shows a schematic diagram of an application scenario in which the vehicle UE selects to transmit the VSSBs at the front time domain positions in the VSSB transmitting time window, when the number of VSSBs to be transmitted is less than the number of the valid unit time domain resources. That is, the four VSSBs to be transmitted are transmitted at the locations where the index information includes V0, V1, V4, and V5.

In the present disclosure, when the vehicle UE uses a valid unit time domain resources to transmit the VSSB to the receiving terminal, it also needs to carry the index information of the valid unit time domain resource, such that the receiving terminal performs time domain synchronization with the vehicle UE according to the index information.

Figure 9:
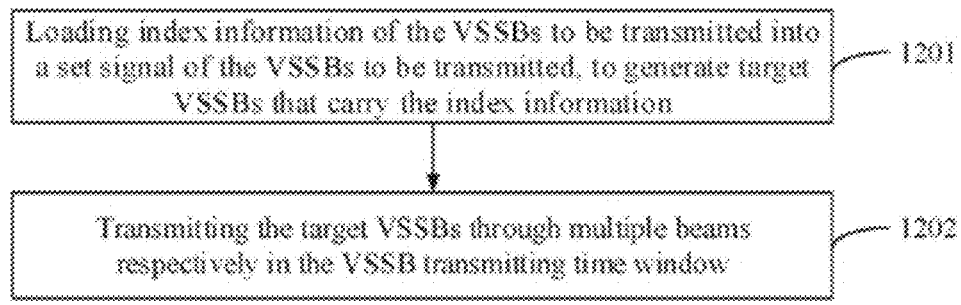
FIG. 9 is a flow chart of another method for transmitting a reference signal according to an example of the present disclosure.

Referring to FIG. 9, FIG. 9 shows a flow chart of another method for transmitting a reference signal according to an example of the present disclosure, step 1243 may include the following steps.

In step 1201, index information of the VSSBs to be transmitted is loaded into a set signal of the VSSBs to be transmitted, to generate target VSSBs that carry the index information.

In the example shown in FIG. 8A, for a VSSB to be transmitted at the location of VSSB3, the vehicle UE can carry the index information of VSSB3 in the set signal of the VSSB, for example, a DMRS and/or a PSBCH signal, and then transmit the same to the receiving terminal.

In the present disclosure, the index information of the VSSBs to be transmitted is loaded into the set signal of the VSSBs to be transmitted in one of the following manners.

Manner 1: the index information of the VSSBs to be transmitted is indicated through corresponding DMRS target sequences.

Taking the case of the four index information being included in a VSSB transmitting time window shown in FIG. 6A as an example, in the present disclosure, the system may specify the correspondence between the above index information and the DMRS sequences, for example, as shown in Table 3 below:

TABLE 3

| Index information | DMRS sequences |
|---|---|
| VSSB0 | * |
| VSSB1 | ** |
| VSSB2 | *** |
| VSSB3 | **** |

Referring to Table 3, the vehicle UE can load the sequence of "**" corresponding to VSSB3 into the DMRS of the VSSB. The above index information VSSB3 is indicated by the DMRS sequence of "**".

Manner 2: the index information of the VSSBs to be transmitted is loaded into a first bit of a preset PSBCH signal.

In another example of the present disclosure, the above-mentioned index information can be loaded into a reserved information bit of the preset PSBCH signal or a new information bit, which is referred to as the first bit in the present disclosure. For example, the bit value of 11 corresponding to VSSB3 is placed in two reserved bits or new bits of the aforementioned preset PSBCH signal to indicate the index information.

Manner 3: A partial bit value of the index information of the VSSBs to be transmitted is loaded through the corresponding DMRS target sequences, and a remaining bit value of the index information of the VSSBs to be transmitted is loaded into a second bit of the preset PSBCH signal.

In another example of the present disclosure, the above index information may be expressed by combining the DMRS target sequence and the bit information set in the preset PSBCH signal.

Still as the above example, the bit value corresponding to the index information of VSSB3 is 11. In the example of the present disclosure, the bit value of "1" at a low bit can be indicated by a preset DMRS target sequence such as "*", and the bit value "1" at the high bit can be placed in a reserved bit or a new bit in the preset PSBCH signal. In the present disclosure, the reserved bit or the new bit used to carry the partial index information in the PSBCH signal is referred to as the second bit. In another example of the present disclosure, the system may also specify that the high bit value corresponding to the index information is indicated through the DMRS target sequence. Correspondingly, the remaining bit value is indicated in the second bit in the preset PSBCH signal, which is not limited by the present disclosure.

In the present disclosure, the VSSBs to be transmitted carrying the VSSB index information are referred to as the target VSSBs.

In step 1202, the target VSSBs are transmitted through multiple beams respectively in the VSSB transmitting time window that occurs periodically.

In the present disclosure, at each of different time instants, a respective beam is used to transmit the target VSSBs in a respective different direction. In the example shown in FIG. 8A, at the position in the time domain corresponding to the first slot of VSSB0 of 5 ms, one beam is used to transmit the target VSSB carrying the index information of VSSB0 in one direction. At the position in the time domain corresponding to the third slot of VSSB2, one beam is used to transmit the target VSSB carrying the index information VSSB2 in another direction; and so on.

In addition, in the present disclosure, regarding how the vehicle UE transmits the PSBCH signal and DMRS of a VSSB in the VSSB transmitting time window, the present disclosure can use the following three transmission modes.

In a first transmission mode, the PSBCH signal and DMRS in a VSSB are transmitted in a Time Division Multiplexing (TDM) mode, that is, the PSBCH signal and the DMRS are transmitted in the time frequency resources corresponding to different symbols respectively. In this mode, the time frequency resources for transmitting the two signals may be the same in the frequency domain, but may be different in the time domain.

In a second transmission mode, the PSBCH signal and DMRS in a VSSB are transmitted in a Frequency Division Multiplexing (FDM) mode, that is, the PSBCH signal and the DMRS are transmitted in different time frequency resources corresponding to a same symbol. In this mode, the time frequency resources for transmitting these two signals can be the same in the time domain.

Figure 10:
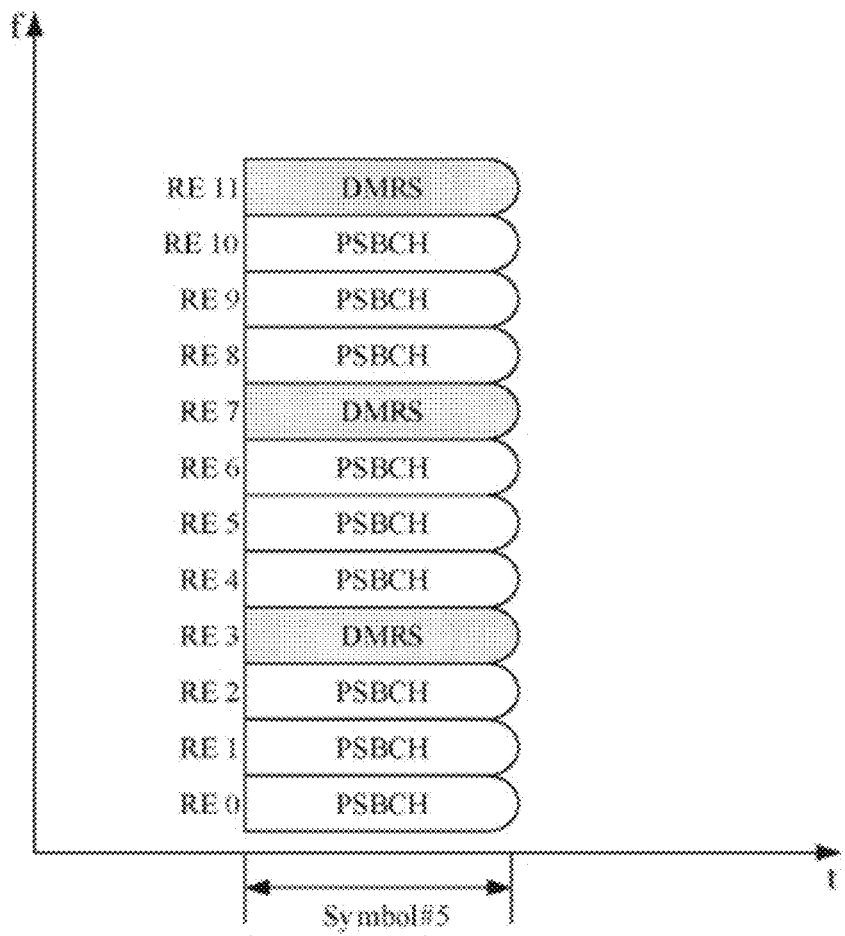
FIG. 10 is a schematic diagram of another application scenario for transmitting a reference signal according to an example of the present disclosure.

In a third transmission mode, the above PSBCH signal and DMRS are transmitted in a TDM-and-FDM-combined manner. FIG. 10 shows a schematic diagram of another application scenario of transmitting a reference signal according to an example of the present disclosure. In the time frequency resources corresponding to the symbol (e.g. symbol #5) occupied by the PSBCH signal, for example, 12 Resource Elements (REs) contained in any RB, some of the resources (e.g. RE #3, RE #7 and RE #11) are used to transmit the DMRS, and the remaining REs are used to transmit the PSBCH signal. In addition, the DMRS is transmitted in the time frequency resources corresponding to symbol #6 (not shown in the figure). In a symbol with both the PSBCH and the DMRS, the proportion of REs occupied by DMRS may be ⅓ or ¼, etc.

In summary, the present disclosure designs a method for transmitting a reference signal for the 5G NR V2X system. The vehicle UE can transmit the reference signal to the receiving terminal in different directions through beams in the VSSB form in the VSSB transmitting time window that periodically arrives. Thus, after receiving the VSSBs transmitted by the vehicle UE, the receiving terminal can quickly perform time domain synchronization with the vehicle UE, by using the reference signal in the VSSBs and the index information carried in the VSSBs. Therefore, the efficiency of time-domain synchronization between the receiving terminal and the vehicle UE can be improved, and the time taken for performing signal synchronization can be reduced. At the same time, the immediacy of communication between the vehicle UE and the receiving terminal can be ensured.

Correspondingly, the present disclosure also provides a method for receiving a reference signal, which is applied to the receiving terminal of the NR V2X system.

Figure 11:
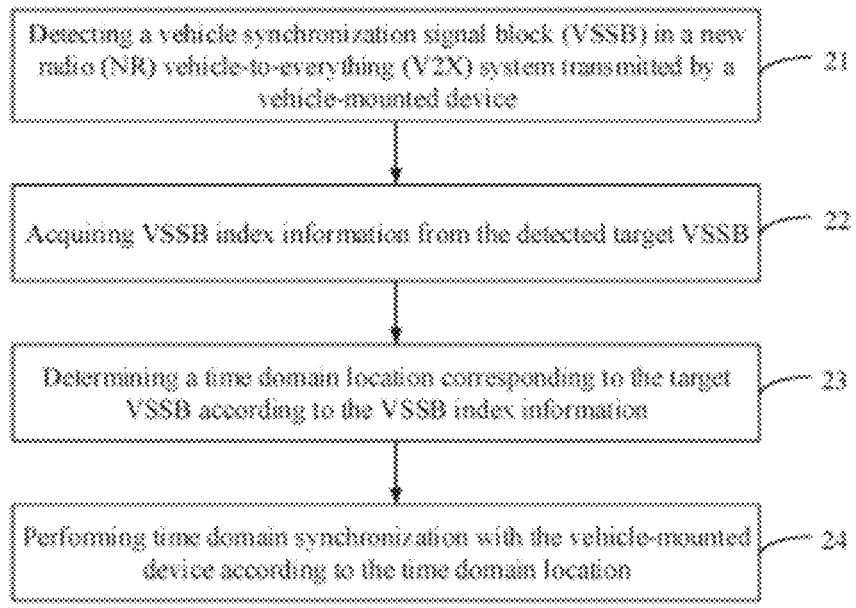
FIG. 11 is a flow chart of a method for receiving a reference signal according to an example of the present disclosure.

Referring to FIG. 11, FIG. 11 shows a flow chart of a method for receiving a reference signal according to an example of the present disclosure, the method may include the following steps.

In step 21, a Vehicle Synchronization Signal Block (VSSB) in a New Radio (NR) Vehicle-to-Everything (V2X) system transmitted by a vehicle UE is detected.

In an example of the present disclosure, the receiving terminal may also specify carrier frequency information through a system built in the chip. Alternatively, the resource configuration information sent by the base station may be received to determine information of a target carrier frequency. Here, the target carrier frequency refers to the carrier frequency used by the receiving terminal to receive the VSSB from the vehicle UE.

Figure 12:
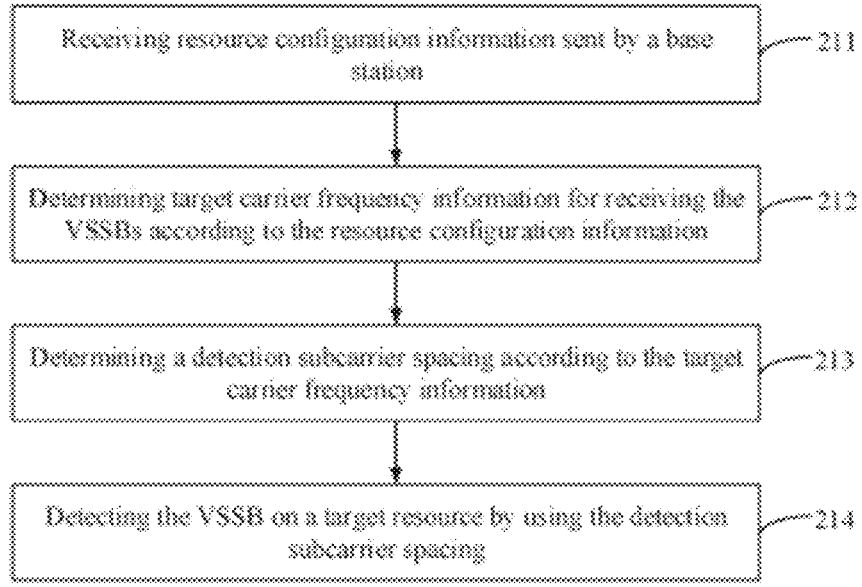
FIG. 12 is a flow chart of another method for receiving a reference signal according to an example of the present disclosure.

In an example, referring to FIG. 12, which shows a flow chart of another method for receiving a reference signal according to an example of the present disclosure, step 21 may include the following steps.

In step 211, resource configuration information sent by a base station is received, where the resource configuration information is configured to inform the receiving terminal to receive the VSSB with a configured resource.

In step 212, information of a target carrier frequency for receiving the VSSB is determined according to the resource configuration information.

Similar to the above steps 1211 and 1212, in the example of the present disclosure, the base station may transmit the resource configuration information to the receiving terminal, to inform the receiving terminal of the carrier frequency for receiving the VSSB transmitted by the vehicle UE.

In step 213, one or more detection subcarrier spacings are determined according to the information of the target carrier frequency.

Assuming that the receiving terminal, such as vehicle B, determines that the carrier frequency of the frequency band of 3 GHz is used for receiving the VSSB. According to the system protocol, one or more available subcarrier spacings may be used for the carrier frequency in a frequency band, and the receiving terminal can determine each of the available subcarrier spacings as the detection subcarrier spacings. For example, the detection subcarrier spacings corresponding to the frequency band of 3 GHz may include: 15 KHz and 30 KHz.

In step 214, the VSSB on a target resource is detected by using the detection subcarrier spacings.

As in the above example, the receiving terminal may use the subcarrier spacings of 15 KHz and 30 KHz to monitor the VSSB, and determine the detection subcarrier spacing used when the VSSB is detected as the target subcarrier spacing, such as 15 KHz.

In step 22, VSSB index information is acquired from the detected target VSSB.

Figure 13:
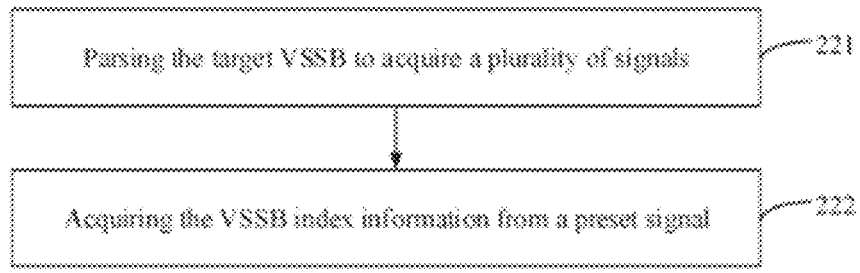
FIG. 13 is a flow chart of another method for receiving a reference signal according to an example of the present disclosure.

Referring to FIG. 13, which shows a flow chart of another method for receiving a reference signal according to an example of the present disclosure, the above step 22 may include the following steps.

In step 221, the target VSSB is parsed to acquire a plurality of signals. Herein, the plurality of signals include: a Primary Sidelink Synchronization Signal (PSSS), a Secondary Sidelink Synchronization Signal (SSSS), a Physical Sidelink Broadcast CHannel (PSBCH) signal, and a DeModulation Reference Signal (DMRS).

In step 222, the VSSB index information is acquired from a preset signal.

The preset signal may be a preset PSBCH signal or a preset DMRS contained in the target VSSB, or a combination of the two signals.

Corresponding to the above step 1201, in the present disclosure, the receiving terminal can acquire VSSB index information from the set signal in the target VSSB in one of the following manners.

Manner 1: the VSSB index information is acquired according to information carried in the DMRS sequence.

For example, assuming that the DMRS sequence carried in the DMRS is "****", the correspondence between the index information and the DMRS sequence is queried under the condition of the frequency band of 3 GHz and the subcarrier spacing of 15 KHz specified by the system. As shown in Table 3 above, it can be determined that the index information of the target VSSB is VSSB3

Manner 2: the VSSB index information is parsed from a first bit of the PSBCH signal.

Corresponding to the example of the manner 2 of the above step 1201, for example, if an information bit value of 11 is detected in the preset bit (i.e. the first bit) of the preset PSBCH signal of the target VSSB, it can be determined that the VSSB index information carried by the target VSSB is VSSB3.

Manner 3: The VSSB index information is acquired from the preset PSBCH signal and the preset DMRS.

Figure 14:
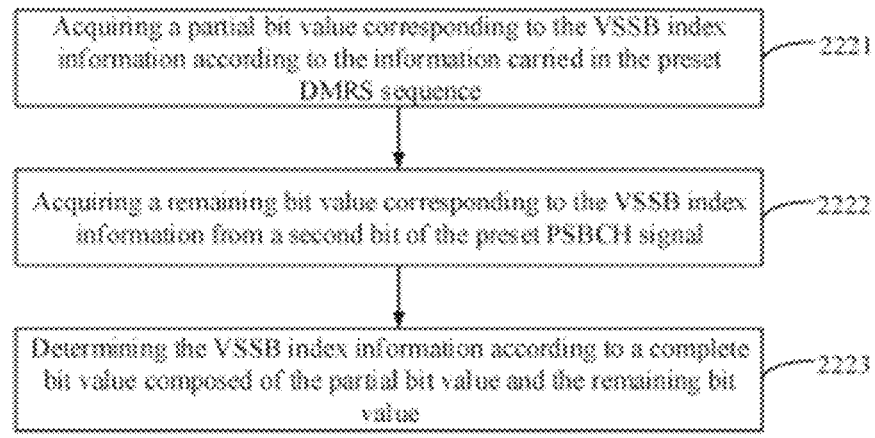
FIG. 14 is a flow chart of another method for receiving a reference signal according to an example of the present disclosure.

Referring to FIG. 14, which shows a flow chart of another method for receiving a reference signal according to an example of the present disclosure, the above step 222 may include the following steps.

In step 2221, a partial bit value corresponding to the VSSB index information is acquired according to the information carried in the preset DMRS sequence.

In step 2222, a remaining bit value corresponding to the VSSB index information is acquired from a second bit of the preset PSBCH signal.

In step 2223, the VSSB index information is determined according to a complete bit value composed of the partial bit value and the remaining bit value.

Corresponding to the example of the manner 3 of the above step 1201, if the bit value corresponding to the DMRS sequence carried in the preset DMRS of the target VSSB is 1; the bit value acquired from the second bit of the preset PSBCH signal of the target VSSB is 1. If the system specifies the DMRS sequence carried in the preset DMRS to indicate the high bit value in the bit value corresponding to the VSSB index information, the value of the second bit of the PSBCH signal is set as the low bit value in the bit value corresponding to the VSSB index information. Or, if the system specifies the DMRS sequence carried in the preset DMRS to indicate the low bit value in the bit value corresponding to the VSSB index information, the value of the second bit of the PSBCH signal is set as the high bit value in the bit value corresponding to the VSSB index information. Then, according to the information carried in the preset DMRS sequence and the value of the second bit of the preset PSBCH signal, the complete bit value corresponding to the VSSB index information for the target VSSB is determined to be 11, therefore, it is determined that the VSSB index information of the target VSSB is VSSB3.

In step 23, a time domain location corresponding to the target VSSB is determined according to the VSSB index information.

Specifically, the receiving terminal determines the time domain location corresponding to the target VSSB according to the VSSB index information, the information of the target carrier frequency and the target subcarrier spacing. Still taking the target carrier frequency of 3 GHz, the target subcarrier spacing of 15 KHz, and the VSSB index information of VSSB3 as an example, according to FIG. 6A, the precise time domain location of the target VSSB in the transmitting time window can be determined, that is, the symbols #2~#6 in the fourth slot (i.e. the slot #3) in the VSSB transmitting time window.

In step 24, time domain synchronization with the vehicle UE is performed according to the time domain location.

For the sake of simple description, the above method examples are all described as a combination of a series of actions. However, those skilled in the art should aware that the present disclosure is not limited by the described sequence of actions, because according to the present disclosure, certain steps may be performed in other order or simultaneously.

Secondly, those skilled in the art should also be aware that the examples described in the specification are optional examples, and the actions and modules involved are not necessarily required by the present disclosure.

Corresponding to the foregoing examples of the method for implementing application functions, the present disclosure also provides examples of the apparatus and corresponding terminal for implementing the application functions.

Figure 15:
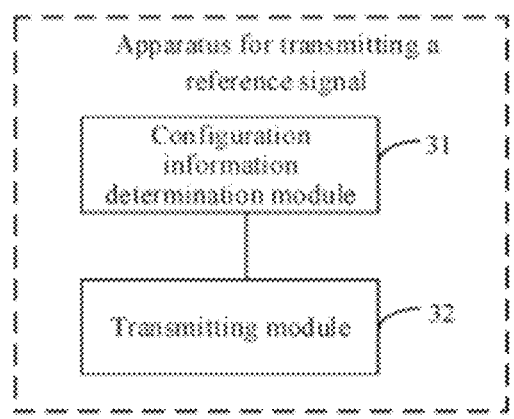
FIG. 15 is a block diagram of an apparatus for transmitting a reference signal according to an example of the present disclosure.

Correspondingly, the present disclosure provides an apparatus for transmitting a reference signal, which can be used in a vehicle UE. Referring to FIG. 15, FIG. 15 shows a block diagram of an apparatus for transmitting a reference signal according to an example of the present disclosure. The apparatus may include:

a configuration information determination module 31, configured to determine transmission configuration information of a vehicle synchronization signal block (VSSB) in a new radio (NR) vehicle-to-everything (V2X) system, where the transmission configuration information includes: a transmitting cycle of the VSSB and a time domain position of a VSSB transmitting time window in the transmitting cycle;

a transmitting module 32, configured to transmit N VSSB s in the VSSB transmitting time window that occurs periodically, according to the transmission configuration information, where N is an integer greater than or equal to 1;

herein, each of the VSSBs includes: a Primary Sidelink Synchronization Signal (PSSS), a Secondary Sidelink Synchronization Signal (SSSS), a Physical Sidelink Broadcast CHannel (PSBCH) signal, and a DeModulation Reference Signal (DMRS).

Figure 16:
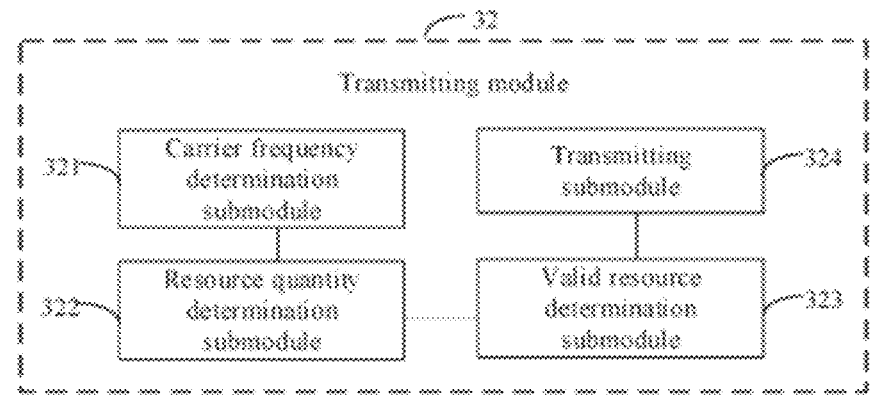
FIG. 16 is a block diagram of another apparatus for transmitting a reference signal according to an example of the present disclosure.

Referring to FIG. 16, FIG. 16 shows a block diagram of an apparatus for transmitting a reference signal according to an example of the present disclosure. On the basis of the apparatus example shown in FIG. 15, the transmitting module 32 may include:

a carrier frequency determination submodule 321, configured to determine information of a target carrier frequency for transmitting the VSSBs;

a resource quantity determination submodule 322, configured to determine a maximum number of time domain resources transmittable for the VSSBs in the VSSB transmitting time window, according to the information of the target carrier frequency.

In an apparatus example of the present disclosure, the resource quantity determination submodule 322 may be further configured to query a preset list according to the information of the target carrier frequency, and determine the maximum number of the time domain resources transmittable for the VSSBs corresponding to a target carrier frequency. Herein, the preset list includes: a correspondence relationship between information of carrier frequency bands and maximum numbers of the time domain resources transmittable for the VSSBs in the VSSB transmitting time window.

The apparatus also includes: a valid resource determination submodule 323, configured to determine information of valid time domain resources in the VSSB transmitting time window, according to the maximum number of the time domain resources transmittable for the VSSBs and configuration information of uplink and downlink time domain resources sent by a base station; and a transmission submodule 324, configured to transmit the VSSBs in the VSSB transmitting time window according to the information of the valid time domain resources.

Figure 17:
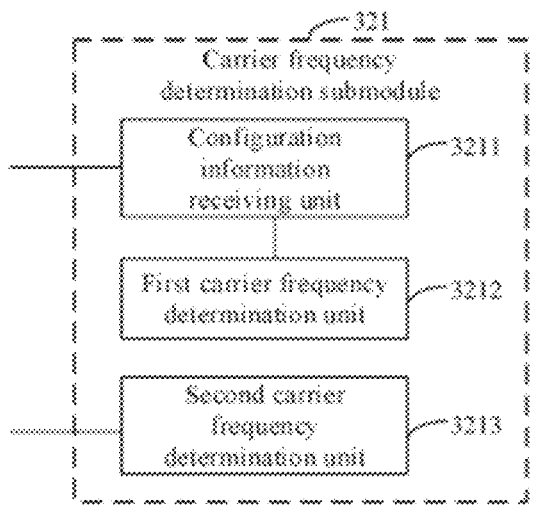
FIG. 17 is a block diagram of another apparatus for transmitting a reference signal according to an example of the present disclosure.

Referring to FIG. 17, FIG. 17 shows a block diagram of another apparatus for transmitting a reference signal according to an example of the present disclosure. On the basis of the apparatus example shown in FIG. 16, the carrier frequency determination submodule 321 may include:

a configuration information receiving unit 3211, configured to receive resource configuration information sent by the base station, where the resource configuration information is configured to inform the vehicle UE to transmit the VSSBs with configured resources;

a first carrier frequency determination unit 3212, configured to determine the information of the target carrier frequency according to the resource configuration information; or a second carrier frequency determination unit 3213, configured to determine the information of the target carrier frequency according to preset resource configuration information.

In an apparatus example of the present disclosure, the information of the valid time domain resources determined by the valid resource determination submodule 323 may include: a number of valid unit time domain resources and a location of each of the valid unit time domain resources.

Figure 18:
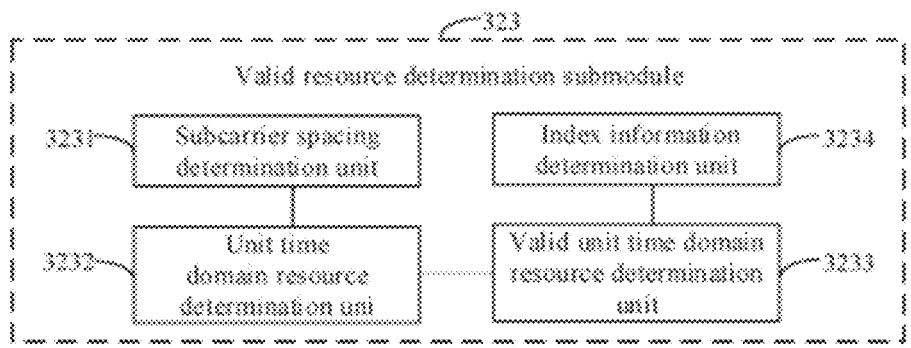
FIG. 18 is a block diagram of another apparatus for transmitting a reference signal according to an example of the present disclosure.

Referring to FIG. 18, FIG. 18 shows a block diagram of an apparatus for transmitting a reference signal according to an example of the present disclosure. On the basis of the apparatus example shown in FIG. 16, the valid resource determination submodule 323 may include:

a subcarrier spacing determination unit 3231, configured to determine a target subcarrier spacing according to the information of the target carrier frequency;

a unit time domain resource determination unit 3232, configured to determine location and index information of each of unit time domain resources in the VSSB transmitting time window, according to the maximum number of the time domain resources transmittable for the VSSBs and the target subcarrier spacing, where each of the unit time domain resources is a time domain resource for carrying one VSSB;

a valid unit time domain resource determination unit 3233, configured to determine the valid time domain resources in a current VSSB transmitting time window, according to the configuration information of the uplink and downlink time domain resources, where the valid time domain resources include uplink time domain resources and/or blank resources configured by the base station;

an index information determination unit 3234, configured to determine the number of the valid unit time domain resources and location and index information of each of the valid unit time domain resources, according to the valid time domain resources and the location and index information of each of the unit time domain resources in the VSSB transmitting time window.

Figure 19:
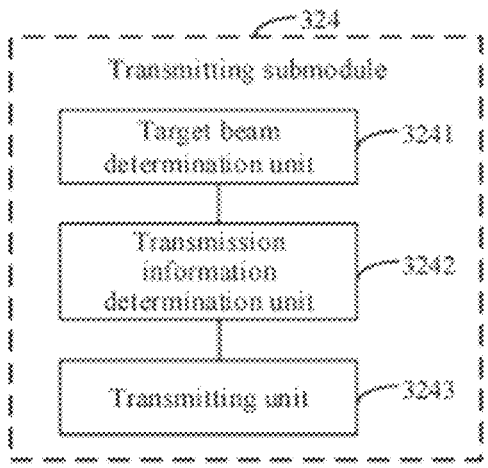
FIG. 19 is a block diagram of another apparatus for transmitting a reference signal according to an example of the present disclosure.

Referring to FIG. 19, FIG. 19 shows a block diagram of an apparatus for transmitting a reference signal according to an example of the present disclosure. On the basis of the apparatus example shown in FIG. 16, the transmission submodule 324 may include:

a target beam determination unit 3241, configured to determine a number of target beams according to preset reference information, where the preset reference information is configured to determine a number of beams for transmitting the VSSBs in a current context, each of the beams is configured to transmit at least one of the VSSBs in a respective preset direction, and the number of the target beams is less than or equal to the maximum number of the time domain resources transmittable for the VSSBs;

a transmission information determination unit 3242, configured to determine transmission information of the VSSBs to be transmitted, based on the information of the valid time domain resources and the number of the target beams, where the transmission information of the VSSBs to be transmitted includes: an actual number of the VSSBs to be transmitted, a location and index information of each of valid unit time domain resources occupied by each of the VSSBs to be transmitted;

a transmitting unit 3243, configured to transmit the VSSBs in the VSSB transmitting time window according to the transmission information of the VSSBs to be transmitted.

Figure 20:
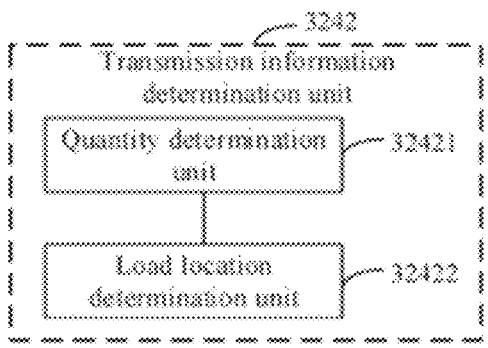
FIG. 20 is a block diagram of another apparatus for transmitting a reference signal according to an example of the present disclosure.

Referring to FIG. 20, FIG. 20 shows a block diagram of an apparatus for transmitting a reference signal according to an example of the present disclosure. On the basis of the apparatus example shown in FIG. 19, the transmission information determination unit 3242 may include:

a quantity determination unit 32421, configured to determine the actual number of the VSSBs to be transmitted, based on the information of the valid time domain resources and the number of the target beams.

In the present disclosure, the quantity determination unit 32421 is further configured to perform at least one of the following operations:

determining the number of the valid unit time domain resources to be the actual number of the VSSBs to be transmitted, in response to that the number of the target beams is greater than or equal to the number of the valid unit time domain resources; or determining the number of the target beams to be the actual number of the VSSBs to be transmitted, in response to that the number of the target beams is less than the number of the valid unit time domain resources.

In addition, the transmission information determination unit 3242 may also include a valid location determination unit 32422, configured to determine the location and index information of each of the valid unit time domain resources occupied by each of the VSSBs to be transmitted, according to the actual number of the VSSBs to be transmitted and the location and index information of each of the valid unit time domain resources.

Figure 21:
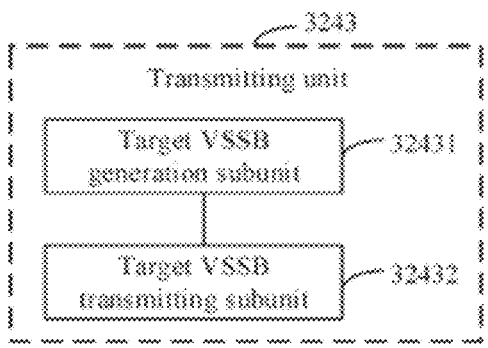
FIG. 21 is a block diagram of another apparatus for transmitting a reference signal according to an example of the present disclosure.

Referring to FIG. 21, FIG. 21 shows a block diagram of an apparatus for transmitting a reference signal according to an example of the present disclosure. On the basis of the apparatus example shown in FIG. 19, the transmitting unit 3243 may include:

a target VSSB generation subunit 32431, configured to load index information of the VSSBs to be transmitted into a set signal of the VSSBs to be transmitted, to generate target VSSBs that carry the index information.

In an apparatus example of the present disclosure, the target VSSB generation subunit 32431 is further configured to perform at least one of the following operations:

indicating the index information of the VSSBs to be transmitted through corresponding DMRS target sequences;

loading the index information of the VSSBs to be transmitted into a first bit of a preset PSBCH signal; or indicating a partial bit value of the index information of the VSSBs to be transmitted through the corresponding DMRS target sequences, and loading a remaining bit value of the index information of the VSSBs to be transmitted into a second bit of the preset PSBCH signal.

In addition, the transmitting unit 3243 may also include a target VSSB transmission subunit 32432, configured to transmit the target VSSBs through multiple beams respectively in the VSSB transmitting time window.

In the present disclosure, the target VSSB transmission subunit 32432 is further configured to transmit the PSBCH signal and the DMRS in each of the VSSBs in at least one of the following manners: frequency division multiplexing (FDM) or time division multiplexing (TDM).

Figure 22:
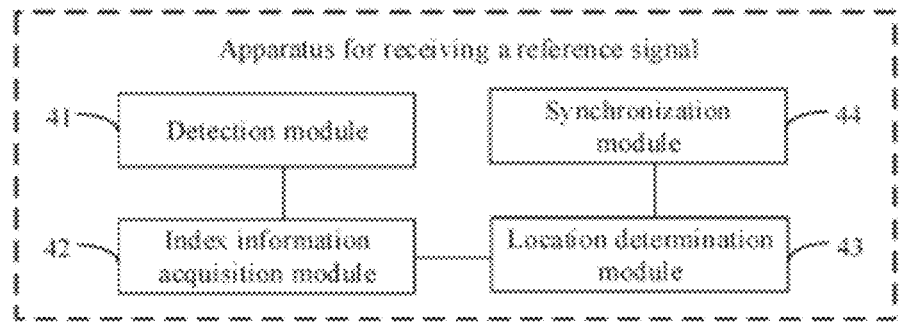
FIG. 22 is a block diagram of an apparatus for receiving a reference signal according to an example of the present disclosure.

Correspondingly, the present disclosure provides an apparatus for receiving a reference signal, which is used in a vehicle UE. Referring to FIG. 22, FIG. 22 shows a block diagram of an apparatus for receiving a reference signal according to an example of the present disclosure. The apparatus may include:

a detection module 41, configured to detect a Vehicle Synchronization Signal Block (VSSB) in a New Radio (NR) Vehicle-to-Everything (V2X) system transmitted by a vehicle UE;

an index information acquisition module 42, configured to acquire VSSB index information from the detected target VSSB;

a location determination module 43, configured to determine a time domain location corresponding to the target VSSB according to the VSSB index information; and a synchronization module 44, configured to perform time domain synchronization with the vehicle UE according to the time domain location.

Figure 23:
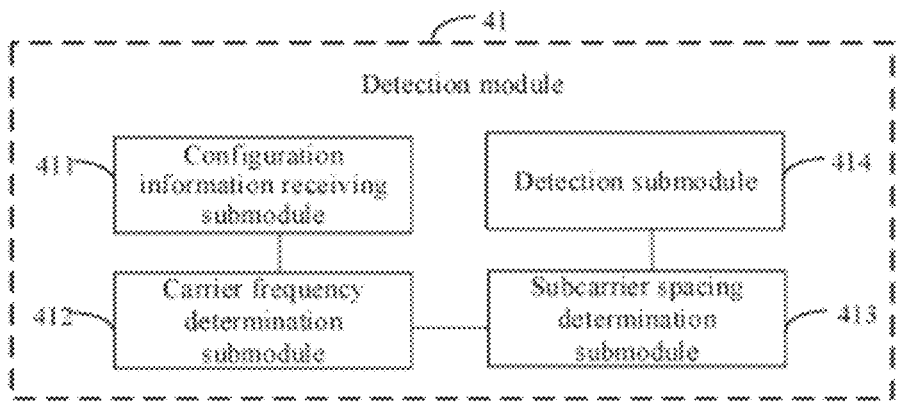
FIG. 23 is a block diagram of another apparatus for receiving a reference signal according to an example of the present disclosure.

Referring to FIG. 23, FIG. 23 shows a block diagram of another apparatus for receiving a reference signal according to an example of the present disclosure. On the basis of the apparatus example shown in FIG. 22, the receiving module 41 may include:

a configuration information receiving submodule 411, configured to receive resource configuration information sent by a base station, where the resource configuration information is configured to inform the receiving terminal to receive the VSSB with a configured resource;

a carrier frequency determination submodule 412, configured to determine information of a target carrier frequency for receiving the VSSBs according to the resource configuration information;

a subcarrier spacing determination submodule 413, configured to determine a detection subcarrier spacing according to the information of the target carrier frequency;

a detection submodule 414, configured to detect the VSSB in a target resource by using the detection subcarrier spacing.

Figure 24:
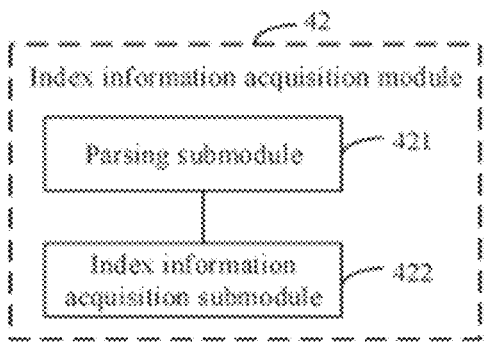
FIG. 24 is a block diagram of another apparatus for receiving a reference signal according to an example of the present disclosure.

Referring to FIG. 24, FIG. 24 shows a block diagram of another apparatus for receiving a reference signal according to an example of the present disclosure. On the basis of the apparatus example shown in FIG. 22, the index information acquisition module 42 may include:

a parsing submodule 421, configured to parse the target VSSB to acquire a plurality of signals, where the plurality of signals include: a Primary Sidelink Synchronization Signal (PSSS), a Secondary Sidelink Synchronization Signal (SSSS), a Physical Sidelink Broadcast CHannel (PSBCH) signal, and a DeModulation Reference Signal (DMRS); and an index information acquisition submodule 422, configured to acquire the VSSB index information from a preset signal, where the preset signal includes at least one of the PSBCH signal or the DMRS sequence.

Figure 25:
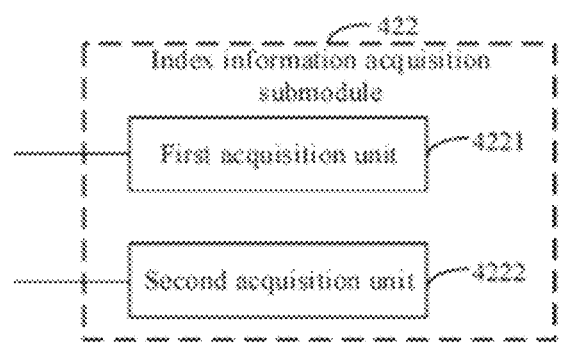
FIG. 25 is a block diagram of another apparatus for receiving a reference signal according to an example of the present disclosure.

Referring to FIG. 25, FIG. 25 shows a block diagram of another apparatus for receiving a reference signal according to an example of the present disclosure. On the basis of the apparatus example shown in FIG. 24, the index information acquisition submodule 422 may include:

a first acquisition unit 4221, configured to acquire the VSSB index information according to information carried in the DMRS sequence;

a second acquisition unit 4222, configured to parse the VSSB index information from a first bit of the PSBCH signal.

Figure 26:
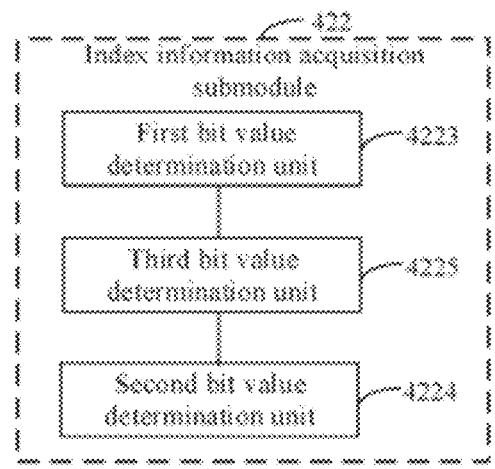
FIG. 26 is a block diagram of another apparatus for receiving a reference signal according to an example of the present disclosure.

Referring to FIG. 26, FIG. 26 shows a block diagram of another apparatus for receiving a reference signal according to an example of the present disclosure. On the basis of the apparatus example shown in FIG. 24, the index information acquisition submodule 422 may include:

a first bit value determination unit 4223, configured to acquire a partial bit value corresponding to the VSSB index information according to the information carried in the preset DMRS sequence;

a second bit value determination unit 4224, configured to acquire a remaining bit value corresponding to the VSSB index information from a second bit of the preset PSBCH signal; and a third bit value determination unit 4225, configured to determine the VSSB index information, according to a complete bit value composed of the partial bit value and the remaining bit value.

In another apparatus example of the present disclosure, the location determination module 43 is further configured to determine the time domain location corresponding to the target VSSB, according to the VSSB index information, the information of the target carrier frequency and a target subcarrier spacing; where the target subcarrier spacing is a detection subcarrier spacing used when the target VSSB is detected.

As for the apparatus examples, since they basically correspond to the method examples, the part of the description of the method examples for related parts can be made as a reference. The apparatus examples described above are merely illustrative. The units described above as separate components may or may not be physically separated, and the components displayed as units may or may not be physical units, that is, they may be located in one place or distributed to multiple network units. Some or all of the modules can be selected according to actual needs to achieve the objectives of the solutions of the present disclosure. Those of ordinary skill in the art can understand and implement it without paying creative labor.

Correspondingly, in one aspect of the present disclosure, a vehicle UE is provided, including:

a processor; and a memory storing a computer program executable by the processor;

herein, the processor is configured to:

determine transmission configuration information of a Vehicle Synchronization Signal Block (VSSB) in a New Radio (NR) Vehicle-to-Everything (V2X) system, where the transmission configuration information includes: a transmitting cycle of the VSSB and a time domain position of a VSSB transmitting time window in the transmitting cycle; and transmit N VSSBs in VSSB transmitting time window, according to the transmission configuration information that occurs periodically, where N is an integer greater than or equal to 1;

herein, each of the VSSBs includes: a Primary Sidelink Synchronization Signal (PSSS), a Secondary Sidelink Synchronization Signal (SSSS), a Physical Sidelink Broadcast CHannel (PSBCH) signal, and a DeModulation Reference Signal (DMRS).

In another aspect of the present disclosure, a terminal is provided, including:

a processor; and a memory storing a computer program executable by the processor;

herein, the processor is configured to:

detect a Vehicle Synchronization Signal Block (VSSB) in a New Radio (NR) Vehicle-to-Everything (V2X) system transmitted by a vehicle UE;

acquire VSSB index information from the detected target VSSB;

determine a time domain location corresponding to the target VSSB, according to the VSSB index information; and perform time domain synchronization with the vehicle UE according to the time domain location.

Figure 27:
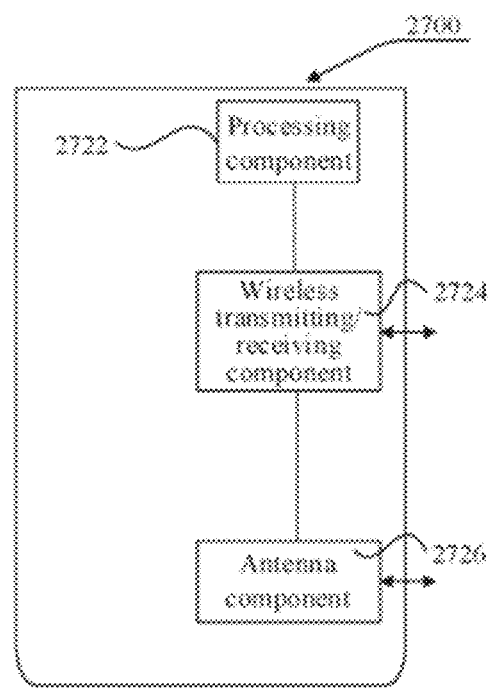
FIG. 27 is a structural diagram of a vehicle UE according to an example of the present disclosure.

As shown in FIG. 27, FIG. 27 is a schematic structural diagram of a vehicle UE 2700 according to an example of the present disclosure. Referring to FIG. 27, a base station 2700 includes a processing component 2722, a wireless transmitting/receiving component 2724, an antenna component 2726, and a signal processing part specific to a wireless interface. The processing component 2722 may further include one or more processors.

One processor of the processing component 2722 is configured to:

determine transmission configuration information of a Vehicle Synchronization Signal Block (VSSB) in a New Radio (NR) Vehicle-to-Everything (V2X) system, where the transmission configuration information includes: a transmitting cycle of the VSSB and a time domain position of a VSSB transmitting time window in the transmitting cycle; and transmit N VSSBs in VSSB transmitting time window that occurs periodically, according to the transmission configuration information, where N is an integer greater than or equal to 1;

herein, each of the VSSBs includes: a Primary Sidelink Synchronization Signal (PSSS), a Secondary Sidelink Synchronization Signal (SSSS), a Physical Sidelink Broadcast CHannel (PSBCH) signal, and a DeModulation Reference Signal (DMRS).

In examples of the present disclosure, there is also provided a non-transitory computer-readable storage medium including instructions and the computer instructions are stored thereon. The computer instructions can be executed by the processing component 2722 of the vehicle UE 2700 to complete the method for transmitting a reference signal described in FIGS. 2-10. For example, the non-transitory computer-readable storage medium may be a read only memory (ROM), a random access memory (RAM), a compact disc read only memory (CD-ROM), a magnetic tape, a floppy disk, an optical data storage device, and the like.

Figure 28:
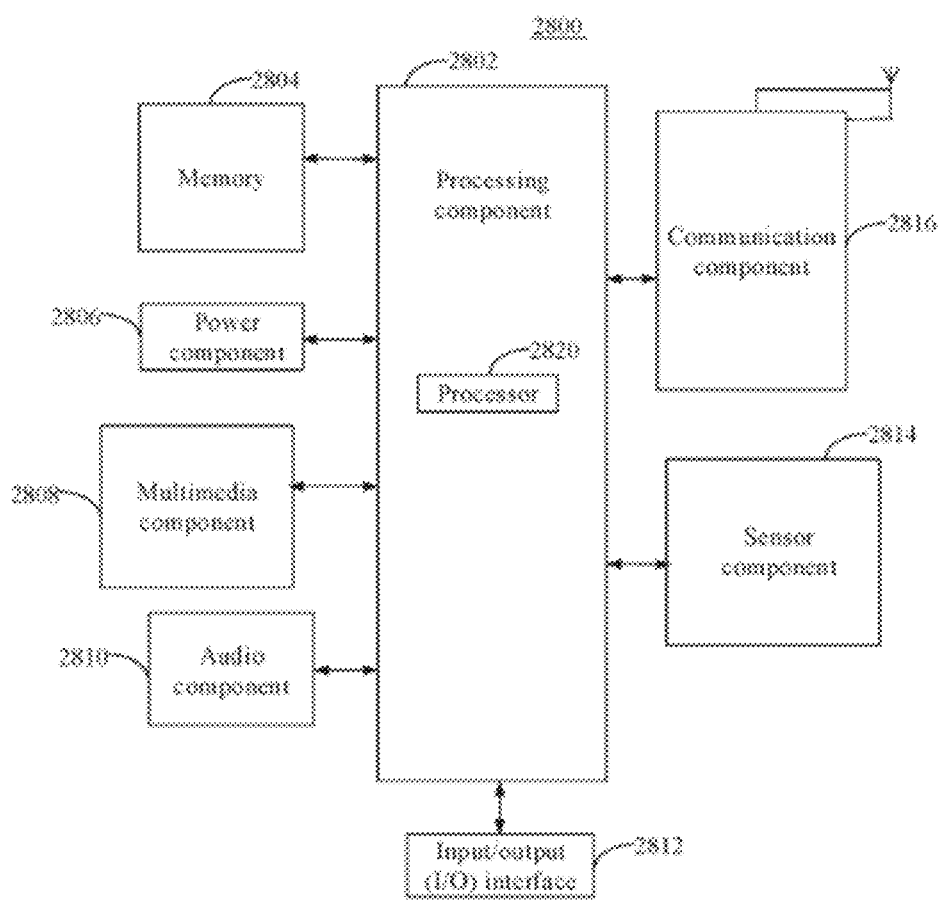
FIG. 28 is a structural diagram of a terminal according to an example of the present disclosure.

FIG. 28 is a structural diagram of a terminal 2800 according to an example of the present disclosure. For example, the terminal 2800 may be a user equipment, which may be specifically a computer, a digital broadcasting terminal, a messaging device, a game console, a tablet device, a medical device, a fitness device, a personal digital assistant, and wearable devices such as a smart watch, smart glasses, smart bracelet, smart running shoes, etc.

Referring to FIG. 28, the terminal 2800 may include one or more of the following components: a processing component 2802, a memory 2804, a power component 2806, a multimedia component 2808, an audio component 2810, an input/output (I/O) interface 2812, a sensor component 2814, and a communication component 2816.

The processing component 2802 typically controls overall operations of the terminal 2800, such as the operations associated with display, telephone calls, data communications, camera operations and recording operations. The processing component 2802 may include one or more processors 2820 to execute instructions to perform all or part of the steps in the above described methods. Moreover, the processing component 2802 may include one or more modules which facilitate the interaction between the processing component 2802 and other components. For instance, the processing component 2802 may include a multimedia module to facilitate the interaction between the multimedia component 2808 and the processing component 2802.

The memory 2804 is configured to store various types of data to support the operation of the terminal 2800. Examples of such data include instructions for any applications or methods operated on the terminal 2800, contact data, phonebook data, messages, pictures, video, etc. The memory 2804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2806 provides power to various components of the terminal 2800. The power component 2806 may include a power management system, one or more power sources, and any other components associated with the generation, management, and distribution of power in the terminal 2800.

The multimedia component 2808 includes a screen providing an output interface between the above-mentioned terminal 2800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 2808 includes a front camera and/or a rear camera. The front camera and the rear camera may receive an external multimedia datum while the terminal 2800 is in an operation mode, such as a photographing mode or a video mode. Each of the front camera and the rear camera may be a fixed optical lens system or have focus and optical zoom capability.

The audio component 2810 is configured to output and/or input audio signals. For example, the audio component 2810 includes a microphone ("MIC") configured to receive an external audio signal when the terminal 2800 is in an operation mode, such as a call mode, a recording mode, and a voice recognition mode. The received audio signal may be further stored in the memory 2804 or transmitted via the communication component 2816. In some examples, the audio component 2810 further includes a speaker to output audio signals.

The I/O interface 2812 provides an interface between the processing component 2802 and peripheral interface modules, such as a keyboard, a click wheel, buttons, and the like. The buttons may include, but are not limited to, a home button, a volume button, a starting button, and a locking button.

The sensor component 2814 includes one or more sensors to provide status assessments of various aspects of the terminal 2800. For instance, the sensor component 2814 may detect an open/closed status of the terminal 2800, relative positioning of components, e.g., the display and the keypad, of the terminal 2800, a change in position of the terminal 2800 or a component of the terminal 2800, a presence or absence of user contact with the terminal 2800, an orientation or an acceleration/deceleration of the terminal 2800, and a change in temperature of the terminal 2800. The sensor component 2814 may include a proximity sensor configured to detect the presence of nearby objects without any physical contact. The sensor component 2814 may also include a light sensor, such as a CMOS or CCD image sensor, for use in imaging applications. In some examples, the sensor component 2814 may also include an accelerometer sensor, a gyroscope sensor, a magnetic sensor, a pressure sensor, or a temperature sensor.

The communication component 2816 is configured to facilitate communication, wired or wirelessly, between the terminal 2800 and other apparatuses. The terminal 2800 can access a wireless network based on a communication standard, such as WiFi, 2G, or 3G, or 4G LTE, or 5G NR, or a combination thereof. In one example, the communication component 2816 receives a broadcast signal or broadcast associated information from an external broadcast management system via a broadcast channel. In one example, the communication component 2816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the terminal 2800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer readable storage medium including instructions, such as included in the memory 2804, executable by the processor 2820 in the terminal 2800, for performing the method for receiving a reference signal described in FIGS. 11-14. For example, the non-transitory computer-readable storage medium may be a ROM, a RAM, a CD-ROM, a magnetic tape, a floppy disc, an optical data storage device, and the like.

According to a first aspect of the present disclosure, there is provided a method for transmitting a reference signal, the method including:

determining transmission configuration information of a vehicle synchronization signal block (VSSB) in a new radio (NR) vehicle-to-everything (V2X) system, the transmission configuration information comprising: a transmitting cycle of the VSSB and a time domain position of a VSSB transmitting time window in the transmitting cycle; and transmitting N VSSBs in the VSSB transmitting time window that occurs periodically, according to the transmission configuration information, where N is an integer greater than or equal to 1;

herein, each of the VSSBs includes: a primary sidelink synchronization signal (PSSS), a secondary sidelink synchronization signal (SSSS), a physical sidelink broadcast channel (PSBCH) signal, and a demodulation reference signal (DMRS).

Alternatively, transmitting the N VSSBs in the VSSB transmitting time window includes:

determining information of a target carrier frequency for transmitting the VSSBs;

determining a maximum number of time domain resources transmittable for the VSSBs in each VSSB transmitting time window, according to the information of the target carrier frequency;

determining information of valid time domain resources in each VSSB transmitting time window, according to the maximum number of the time domain resources transmittable for the VSSBs and configuration information of uplink and downlink time domain resources sent by a base station;

transmitting the VSSBs in the VSSB transmitting time window according to the information of the valid time domain resources.

Alternatively, determining the information of the target carrier frequency for transmitting the VSSB s, includes:

receiving resource configuration information sent by the base station, the resource configuration information being configured to inform the vehicle UE to transmit the VSSBs with configured resources;

determining the information of the target carrier frequency according to the resource configuration information; or, determining the information of the target carrier frequency according to preset resource configuration information.

Alternatively, determining the maximum number of the time domain resources transmittable for the VSSBs in each VSSB transmitting time window, according to the information of the target carrier frequency, includes:

querying, a preset list according to the information of the target carrier frequency, and determining, the maximum number of the time domain resources transmittable for the VSSBs corresponding to a target carrier frequency, where the preset list includes: a correspondence relationship between information of carrier frequency bands and maximum numbers of the time domain resources transmittable for the VSSBs in each VSSB transmitting time window.

Alternatively, the information of the valid time domain resources includes a number of valid unit time domain resources and a location of each of the valid unit time domain resources;

herein, determining the information of the valid time domain resources in each VSSB transmitting time window, according to the maximum number of the time domain resources transmittable for the VSSBs and the configuration information of the uplink and downlink time domain resources sent by the base station includes:

determining a target subcarrier spacing according to the information of the target carrier frequency;

determining location and index information of each of unit time domain resources in each VSSB transmitting time window, according to the maximum number of the time domain resources transmittable for the VSSBs and the target subcarrier spacing, where each of the unit time domain resources is a time domain resource for carrying one VSSB;

determining the valid time domain resources in a current VSSB transmitting time window, according to the configuration information of the uplink and downlink time domain resources, where the valid time domain resources comprise uplink time domain resources and/or blank resources configured by the base station;

determining, the number of the valid unit time domain resources and location and index information of each of the valid unit time domain resources, according to the valid time domain resources and the location and index information of each of the unit time domain resources in each VSSB transmitting time window.

Alternatively, transmitting the VSSBs in the VSSB transmitting time window according to the information of the valid time domain resources includes:

determining a number of target beams according to preset reference information, the preset reference information being configured to determine a number of beams for transmitting the VSSBs in a current context, where each of the beams is configured to transmit at least one of the VSSBs in a respective preset direction, and the number of the target beams is less than or equal to the maximum number of the time domain resources transmittable for the VSSBs;

determining transmission information of the VSSBs to be transmitted, based on the information of the valid time domain resources and the number of the target beams, where the transmission information of the VSSBs to be transmitted includes: an actual number of the VSSBs to be transmitted, a location and index information of each of valid unit time domain resources occupied by each of the VSSBs to be transmitted;

transmitting the VSSBs in the VSSB transmitting time window according to the transmission information of the VSSBs to be transmitted.

Alternatively, determining the transmission information of the VSSBs to be transmitted, based on the information of the valid time domain resources and the number of the target beams includes:

determining the actual number of the VSSBs to be transmitted, based on the information of the valid time domain resources and the number of the target beams;

determining the location and index information of each of the valid unit time domain resources occupied by each of the VSSBs to be transmitted, according to the actual number of the VSSBs to be transmitted and the location and index information of each of the valid unit time domain resources.

Alternatively, the actual number of the VSSBs to be transmitted is determined based on the information of the valid time domain resources and the number of the target beams in one of the following manners:

determining the number of the valid unit time domain resources to be the actual number of the VSSBs to be transmitted, in response to that the number of the target beams is greater than or equal to the number of the valid unit time domain resources; or determining the number of the target beams to be the actual number of the VSSBs to be transmitted, in response to that the number of the target beams is less than the number of the valid unit time domain resources.

Alternatively, transmitting the VSSBs in the VSSB transmitting time window, according to the transmission information of the VSSBs to be transmitted includes:

loading index information of the VSSBs to be transmitted into a set signal of the VSSBs to be transmitted, to generate target VSSBs that carry the index information;

transmitting the target VSSBs through multiple beams respectively in the VSSB transmitting time window.

Alternatively, the index information of the VSSBs to be transmitted is loaded into the set signal of the VSSBs to be transmitted in one of the following manners:

indicating the index information of the VSSBs to be transmitted through corresponding DMRS target sequences;

loading the index information of the VSSBs to be transmitted into a first bit of a preset PSBCH signal; or indicating a partial bit value of the index information of the VSSBs to be transmitted through the corresponding DMRS target sequences, and loading a remaining bit value of the index information of the VSSBs to be transmitted into a second bit of the preset PSBCH signal.

Alternatively, transmitting the N VSSBs in the VSSB transmitting time window includes:

transmitting the PSBCH signal and the DMRS in each of the VSSBs in at least one of the following manners: frequency division multiplexing (FDM) or time division multiplexing (TDM).

According to a second aspect of the present disclosure, there is provided a method for receiving a reference signal, the method including:

detecting a vehicle synchronization signal block (VSSB) in a new radio (NR) vehicle-to-everything (V2X) system transmitted by a vehicle UE;

acquiring VSSB index information from the detected target VSSB;

determining a time domain location corresponding to the target VSSB according to the VSSB index information; and performing time domain synchronization with the vehicle UE according to the time domain location.

Alternatively, detecting the VSSB transmitted by the vehicle UE includes:

receiving resource configuration information sent by a base station, the resource configuration information being configured to inform the receiving terminal to receive the VSSB with a configured resource;

determining information of a target carrier frequency for receiving the VSSB s according to the resource configuration information;

determining a detection subcarrier spacing according to the information of the target carrier frequency; and detecting the VSSB on a target resource by using the detection subcarrier spacing.

Alternatively, acquiring the VSSB index information from the detected target VSSB includes:

parsing the target VSSB to acquire a plurality of signals, where the plurality of signals comprise: a primary sidelink synchronization signal (PSSS), a secondary sidelink synchronization signal (SSSS), a physical sidelink broadcast channel (PSBCH) signal, and a demodulation reference signal (DMRS); and acquiring the VSSB index information from a preset signal, where the preset signal includes at least one of the PSBCH signal or the DMRS sequence.

Alternatively, acquiring the VSSB index information from the preset signal includes:

acquiring the VSSB index information according to information carried in the DMRS sequence;

parsing the VSSB index information from a first bit of the PSBCH signal.

Alternatively, acquiring the VSSB index information from the preset signal includes:

acquiring a partial bit value corresponding to the VSSB index information according to the information carried in the preset DMRS sequence;

acquiring a remaining bit value corresponding to the VSSB index information from a second bit of the preset PSBCH signal; and determining the VSSB index information according to a complete bit value composed of the partial bit value and the remaining bit value.

Alternatively, determining the time domain location corresponding to the target VSSB, according to the VSSB index information includes:

determining the time domain location corresponding to the target VSSB, according to the VSSB index information, the information of the target carrier frequency and a target subcarrier spacing; where the target subcarrier spacing is a detection subcarrier spacing used when the target VSSB is detected.

According to a third aspect of the present disclosure, there is provided an apparatus for transmitting a reference signal, the apparatus including:

a configuration information determination module, configured to determine transmission configuration information of a vehicle synchronization signal block (VSSB) in a new radio (NR) vehicle-to-everything (V2X) system, the transmission configuration information comprising: a transmitting cycle of the VSSB and a time domain position of a VSSB transmitting time window in the transmitting cycle; and a transmitting module, configured to transmit N VSSBs in the VSSB transmitting time window that occurs periodically, according to the transmission configuration information, where N is an integer greater than or equal to 1;

where each of the VSSBs includes: a primary sidelink synchronization signal (PSSS), a secondary sidelink synchronization signal (SSSS), a physical sidelink broadcast channel (PSBCH) signal, and a demodulation reference signal (DMRS).

Alternatively, the transmitting module includes:

a carrier frequency determination submodule, configured to determine information of a target carrier frequency for transmitting the VSSBs;

a resource quantity determination submodule, configured to determine a maximum number of time domain resources transmittable for the VSSBs in the VSSB transmitting time window, according to the information of the target carrier frequency;

a valid resource determination submodule, configured to determine information of valid time domain resources in the VSSB transmitting time window, according to the maximum number of the time domain resources transmittable for the VSSBs and configuration information of uplink and downlink time domain resources sent by a base station;

a transmission submodule, configured to transmit the VSSBs in the VSSB transmitting time window according to the information of the valid time domain resources.

Alternatively, the carrier frequency determination submodule, includes:

a configuration information receiving unit, configured to receive resource configuration information sent by the base station, the resource configuration information being configured to inform the vehicle UE to transmit the VSSBs with configured resources, and a first carrier frequency determination unit, configured to determine the information of the target carrier frequency according to the resource configuration information; or, a second carrier frequency determination unit, configured to determine the information of the target carrier frequency according to preset resource configuration information.

Alternatively, the resource quantity determination submodule is further configured to query a preset list according to the information of the target carrier frequency, and determine the maximum number of the time domain resources transmittable for the VSSBs corresponding to a target carrier frequency, herein, the preset list includes: a correspondence relationship between information of carrier frequency bands and maximum numbers of the time domain resources transmittable for the VSSBs in the VSSB transmitting time window.

Alternatively, the information of the valid time domain resources includes a number of valid unit time domain resources and a location of each of the valid unit time domain resources;

herein, the valid resource determination submodule includes:

a subcarrier spacing determination unit, configured to determine a target subcarrier spacing according to the information of the target carrier frequency;

a unit time domain resource determination unit, configured to determine location and index information of each of unit time domain resources in the VSSB transmitting time window, according to the maximum number of the time domain resources transmittable for the VSSBs and the target subcarrier spacing, where each of the unit time domain resources is a time domain resource for carrying one VSSB;

a valid unit time domain resource determination unit, configured to determine the valid time domain resources in a current VSSB transmitting time window, according to the configuration information of the uplink and downlink time domain resources, where the valid time domain resources comprise uplink time domain resources and/or blank resources configured by the base station;

an index information determination unit, configured to determine the number of the valid unit time domain resources and location and index information of each of the valid unit time domain resources, according to the valid time domain resources and the location and index information of each of the unit time domain resources in the VSSB transmitting time window.

Alternatively, the transmission submodule includes:

a target beam determination unit, configured to determine a number of target beams according to preset reference information, the preset reference information being configured to determine a number of beams for transmitting the VSSBs in a current context, where each of the beams is configured to transmit at least one of the VSSBs in a respective preset direction, and the number of the target beams is less than or equal to the maximum number of the time domain resources transmittable for the VSSBs;

a transmission information determination unit, configured to determine transmission information of the VSSBs to be transmitted, based on the information of the valid time domain resources and the number of the target beams, where the transmission information of the VSSBs to be transmitted includes: an actual number of the VSSBs to be transmitted, a location and index information of each of valid unit time domain resources occupied by each of the VSSBs to be transmitted; and a transmitting unit, configured to transmit the VSSBs in the VSSB transmitting time window according to the transmission information of the VSSBs to be transmitted.

Alternatively, the transmission information determination unit, includes:

a quantity determination unit, configured to determine the actual number of the VSSBs to be transmitted, based on the information of the valid time domain resources and the number of the target beams; and a valid location determination unit, configured to determine the location and index information of each of the valid unit time domain resources occupied by each of the VSSBs to be transmitted, according to the actual number of the VSSBs to be transmitted and the location and index information of each of the valid unit time domain resources.

Alternatively, the quantity determination unit is further configured to perform at least one of the following operations:

determining the number of the valid unit time domain resources to be the actual number of the VSSBs to be transmitted, in response to that the number of the target beams is greater than or equal to the number of the valid unit time domain resources; or determining the number of the target beams to be the actual number of the VSSBs to be transmitted, in response to that the number of the target beams is less than the number of the valid unit time domain resources.

Alternatively, the transmitting unit includes:

a target VSSB generation subunit, configured to load index information of the VSSBs to be transmitted into a set signal of the VSSBs to be transmitted, to generate target VSSBs that carry the index information;

a target VSSB transmission subunit, configured to transmit the target VSSBs through multiple beams respectively in the VSSB transmitting time window.

Alternatively, the target VSSB generation subunit is further configured to perform at least one of the following operations:

indicating the index information of the VSSBs to be transmitted through corresponding DMRS target sequences;

loading the index information of the VSSBs to be transmitted into a first bit of a preset PSBCH signal; or indicating a partial bit value of the index information of the VSSBs to be transmitted through the corresponding DMRS target sequences, and loading a remaining bit value of the index information of the VSSBs to be transmitted into a second bit of the preset PSBCH signal.

Alternatively, the target VSSB transmission subunit is further configured to transmit the PSBCH signal and the DMRS in each of the VSSBs in at least one of the following manners: frequency division multiplexing (FDM) or time division multiplexing (TDM).

According to a fourth aspect of the present disclosure, there is provided an apparatus for transmitting a reference signal, the apparatus including:

a detection module, configured to detect a vehicle synchronization signal block (VSSB) in a new radio (NR) vehicle-to-everything (V2X) system transmitted by a vehicle UE;

an index information acquisition module, configured to acquire VSSB index information from the detected target VSSB;

a location determination module, configured to determine a time domain location corresponding to the target VSSB according to the VSSB index information; and a synchronization module, configured to perform time domain synchronization with the vehicle UE according to the time domain location.

Alternatively, the detection module includes:

a configuration information receiving submodule, configured to receive resource configuration information sent by a base station, the resource configuration information being configured to inform the receiving terminal to receive the VSSB with a configured resource;

a carrier frequency determination submodule, configured to determine information of a target carrier frequency for receiving the VSSBs according to the resource configuration information;

a subcarrier spacing determination submodule, configured to determine a detection subcarrier spacing according to the information of the target carrier frequency; and a detection submodule, configured to detect the VSSB in a target resource by using the detection subcarrier spacing.

Alternatively, the index information acquisition module, includes:

a parsing submodule, configured to parse the target VSSB to acquire a plurality of signals, where the plurality of signals comprise: a primary sidelink synchronization signal (PSSS), a secondary sidelink synchronization signal (SSSS), a physical sidelink broadcast channel (PSBCH) signal, and a demodulation reference signal (DMRS); and an index information acquisition submodule, configured to acquire the VSSB index information from a preset signal, where the preset signal includes at least one of the PSBCH signal or the DMRS sequence.

Alternatively, the index information acquisition submodule, includes:

a first acquisition unit, configured to acquire the VSSB index information according to information carried in the DMRS sequence;

a second acquisition unit, configured to parse the VSSB index information from a first bit of the PSBCH signal.

Alternatively, the index information acquisition submodule, includes:

a first bit value determination unit, configured to acquire a partial bit value corresponding to the VSSB index information according to the information carried in the preset DMRS sequence;

a second bit value determination unit, configured to acquire a remaining bit value corresponding to the VSSB index information from a second bit of the preset PSBCH signal; and a third bit value determination unit, configured to determine the VSSB index information, according to a complete bit value composed of the partial bit value and the remaining bit value.

Alternatively, the location determination module is further configured to determine the time domain location corresponding to the target VSSB, according to the VSSB index information, the information of the target carrier frequency and a target subcarrier spacing; where the target subcarrier spacing is a detection subcarrier spacing used when the target VSSB is detected According to a fifth aspect of the present disclosure, there is provided a non-transitory computer readable medium having stored thereon computer executable instructions that, when executed by a processor, cause operations of any of the method described in the above first aspect of the present disclosure to be performed.

According to a sixth aspect of the present disclosure, there is provided a non-transitory computer readable medium having stored thereon computer executable instructions that, when executed by a processor, cause operations of any of the method described in the above second aspect of the present disclosure to be performed.

According to a seventh aspect of the present disclosure, there is provided a vehicle UE, includes:

a processor;

a memory storing a computer program executable by the processor;

herein, the processor is configured to:

determine transmission configuration information of a vehicle synchronization signal block (VSSB) in a new radio (NR) vehicle-to-everything (V2X) system, the transmission configuration information comprising: a transmitting cycle of the VSSB and a time domain position of a VSSB transmitting time window in the transmitting cycle; and;

transmit N VSSBs in the VSSB transmitting time window, according to the transmission configuration information that occurs periodically, where N is an integer greater than or equal to 1;

herein, each of the VSSBs includes: a primary sidelink synchronization signal (PSSS), a secondary sidelink synchronization signal (SSSS), a physical sidelink broadcast channel (PSBCH) signal, and a demodulation reference signal (DMRS).

According to an eighth aspect of the present disclosure, there is provided a vehicle UE, includes:

a processor;

a memory storing a computer program executable by the processor;

herein, the processor is configured to:

detect a vehicle synchronization signal block (VSSB) in a new radio (NR) vehicle-to-everything (V2X) system transmitted by a vehicle UE;

acquire VSSB index information from the detected target VSSB;

determine a time domain location corresponding to the target VSSB, according to the VSSB index information; and perform time domain synchronization with the vehicle UE according to the time domain location.

The technical solutions provided by the examples of the present disclosure may include the following beneficial effects.

The present disclosure provides a method, apparatus, vehicle UE and terminal for transmitting and receiving a reference signal ensure that the vehicle UE and the receiving terminal in the NR V2X system quickly complete time domain synchronization.

Other examples of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for transmitting a vehicle synchronization signal block (VSSB), comprising:
   determining transmission configuration information of the VSSB in a new radio (NR) vehicle-to-everything (V2X) system, wherein the transmission configuration information comprises: a transmitting cycle of the VSSB, and a time domain position of a VSSB transmitting time window in the transmitting cycle; and
   transmitting N VSSBs in the VSSB transmitting time window that occurs periodically, according to the transmission configuration information, wherein N is an integer greater than or equal to 1;
   wherein each of the VSSBs comprises: a primary sidelink synchronization signal (PSSS), a secondary sidelink synchronization signal (SSSS), a physical sidelink broadcast channel (PSBCH) signal, and a demodulation reference signal (DMRS);
   wherein transmitting the N VSSBs in the VSSB transmitting time window that occurs periodically comprises:
   determining information of a target carrier frequency for transmitting the VSSBs;
   determining a maximum number of time domain resources transmittable for the VSSBs in the VSSB transmitting time window, according to the information of the target carrier frequency;
   determining information of valid time domain resources in the VSSB transmitting time window, according to the maximum number of the time domain resources transmittable for the VSSBs and configuration information of uplink and downlink time domain resources sent by a base station; and
   transmitting the VSSBs in the VSSB transmitting time window according to the information of the valid time domain resources.

2. The method according to claim 1, wherein determining the information of the target carrier frequency for transmitting the VSSBs comprises:
   receiving resource configuration information sent by the base station, wherein the resource configuration information is configured to inform a vehicle user equipment (UE) to transmit the VSSBs with configured resources; and
   determining the information of the target carrier frequency according to the resource configuration information, or determining the information of the target carrier frequency according to preset resource configuration information.

3. The method of claim 1, wherein determining the maximum number of the time domain resources transmittable for the VSSBs in the VSSB transmitting time window, according to the information of the target carrier frequency comprises:
   querying a preset list according to the information of the target carrier frequency, and
   determining the maximum number of the time domain resources transmittable for the VSSBs corresponding to the target carrier frequency,
   wherein the preset list comprises: a correspondence relationship between information of carrier frequency bands and maximum numbers of the time domain resources transmittable for the VSSBs in the VSSB transmitting time window.

4. The method of claim 1, wherein the information of the valid time domain resources comprises: a number of valid unit time domain resources and a location of each of the valid unit time domain resources; and
   wherein determining the information of the valid time domain resources in the VSSB transmitting time window, according to the maximum number of the time domain resources transmittable for the VSSBs and the configuration information of the uplink and downlink time domain resources sent by the base station comprises:
   determining a target subcarrier spacing according to the information of the target carrier frequency;
   determining location and index information of each of unit time domain resources in the VSSB transmitting time window, according to the maximum number of the time domain resources transmittable for the VSSBs and the target subcarrier spacing, wherein each of the unit time domain resources is a time domain resource for carrying one VSSB;
   determining the valid time domain resources in a current VSSB transmitting time window, according to the configuration information of the uplink and downlink time domain resources, wherein the valid time domain resources comprise at least one of following resources: uplink time domain resources configured by the base station, or blank resources configured by the base station; and
   determining the number of the valid unit time domain resources and location and index information of each of the valid unit time domain resources, according to the valid time domain resources and the location and index information of each of the unit time domain resources in the VSSB transmitting time window.

5. The method of claim 4, wherein transmitting the VSSBs in the VSSB transmitting time window according to the information of the valid time domain resources comprises:
   determining a number of target beams according to preset reference information, the preset reference information being configured to determine a number of beams for transmitting the VSSBs in a current context, wherein each of the beams is configured to transmit at least one of the VSSBs in a preset direction, and the number of the target beams is less than or equal to the maximum number of the time domain resources transmittable for the VSSBs;
   determining transmission information of the VSSBs to be transmitted, based on the information of the valid time domain resources and the number of the target beams, wherein the transmission information of the VSSBs to be transmitted comprises: an actual number of the VSSBs to be transmitted, a location and index information of each of valid unit time domain resources occupied by each of the VSSBs to be transmitted; and
   transmitting the VSSBs in the VSSB transmitting time window according to the transmission information of the VSSBs to be transmitted.

6. The method of claim 5, wherein determining the transmission information of the VSSBs to be transmitted, based on the information of the valid time domain resources and the number of the target beams comprises:
   determining the actual number of the VSSBs to be transmitted, based on the information of the valid time domain resources and the number of the target beams; and determining, the location and index information of each of the valid unit time domain resources occupied by each of the VSSBs to be transmitted, according to the actual number of the VSSBs to be transmitted and the location and index information of each of the valid unit time domain resources.

7. The method of claim 6, wherein the actual number of the VSSBs to be transmitted is determined based on the information of the valid time domain resources and the number of the target beams in one of following manners:
   determining the number of the valid unit time domain resources to be the actual number of the VSSBs to be transmitted, in response to that the number of the target beams is greater than or equal to the number of the valid unit time domain resources; or
   determining the number of the target beams to be the actual number of the VSSBs to be transmitted, in response to that the number of the target beams is less than the number of the valid unit time domain resources.

8. The method of claim 6, wherein transmitting the VSSBs in the VSSB transmitting time window according to the transmission information of the VSSBs to be transmitted comprises:
   loading index information of the VSSBs to be transmitted into a set signal of the VSSBs to be transmitted, to generate target VSSBs that carry the index information; and
   transmitting the target VSSBs through multiple beams in the VSSB transmitting time window.

9. The method of claim 8, wherein the index information of the VSSBs to be transmitted is loaded into the set signal of the VSSBs to be transmitted in one of following manners:
   indicating the index information of the VSSBs to be transmitted through corresponding DMRS target sequences;
   loading the index information of the VSSBs to be transmitted into a first bit of a preset PSBCH signal; or
   indicating a partial bit value of the index information of the VSSBs to be transmitted through the corresponding DMRS target sequences, and loading a remaining bit value of the index information of the VSSBs to be transmitted into a second bit of the preset PSBCH signal.

10. The method of claim 1, wherein transmitting the N VSSBs in the VSSB transmitting time window comprises:
    transmitting the PSBCH signal and the DMRS in each of the VSSBs in at least one of following modes: frequency division multiplexing (FDM) or time division multiplexing (TDM).

11. A method for receiving a vehicle synchronization signal block (VSSB), comprising:
    detecting a target VSSB in a new radio (NR) vehicle-to-everything (V2X) system transmitted by a vehicle user equipment (UE);
    acquiring VSSB index information from the detected target VSSB;
    determining a time domain location corresponding to the target VSSB according to the VSSB index information; and
    performing time domain synchronization with the vehicle UE according to the time domain location;
    wherein detecting the target VSSB transmitted by the vehicle UE comprises:
    receiving resource configuration information sent by a base station, the resource configuration information being configured to inform a receiving terminal to receive the target VSSB with a configured resource;
    determining information of a target carrier frequency for receiving the target VSSB according to the resource configuration information;
    determining a detection subcarrier spacing according to the information of the target carrier frequency; and
    detecting the target VSSB on a target resource by using the detection subcarrier spacing;
    wherein a maximum number of time domain resources transmittable for VSSBs in a VSSB transmitting time window is determined according to the information for the target carrier frequency; and information of valid time domain resources in the VSSB transmitting time window is determined according to the maximum number of the time domain resources transmittable for VSSBs and configuration information of uplink and downlink time domain resources.

12. The method of claim 11, wherein acquiring the VSSB index information from the detected target VSSB comprises:
    parsing the target VSSB to acquire a plurality of signals, wherein the plurality of signals comprise: a primary sidelink synchronization signal (PSSS), a secondary sidelink synchronization signal (SSSS), a physical sidelink broadcast channel (PSBCH) signal, and a demodulation reference signal (DMRS); and
    acquiring the VSSB index information from a preset signal, wherein the preset signal comprises at least one of the PSBCH signal or the DMRS.

13. The method of claim 12, wherein acquiring the VSSB index information from the preset signal comprises:
    acquiring the VSSB index information according to information carried in a preset DMRS sequence; and
    parsing the VSSB index information from a first bit of a preset PSBCH signal.

14. The method of claim 12, wherein acquiring the VSSB index information from the preset signal comprises:
    acquiring a partial bit value corresponding to the VSSB index information according to the information carried in a preset DMRS sequence;
    acquiring a remaining bit value corresponding to the VSSB index information from a second bit of a preset PSBCH signal; and
    determining the VSSB index information according to a complete bit value composed of the partial bit value and the remaining bit value.

15. The method of claim 11, wherein determining the time domain location corresponding to the target VSSB according to the VSSB index information comprises:
    determining the time domain location corresponding to the target VSSB, according to the VSSB index information, information of a target carrier frequency and a target subcarrier spacing; wherein the target subcarrier spacing is a detection subcarrier spacing used when the target VSSB is detected.

16. A terminal, comprising:
    a processor;
    a memory storing a computer program executable by the processor;
    wherein the processor is configured to perform the method of claim 11.

17. A vehicle user equipment (UE), comprising:
    a processor;
    a memory storing a computer program executable by the processor;

wherein the processor is configured to:

determine transmission configuration information of a vehicle synchronization signal block (VSSB) in a new radio (NR) vehicle-to-everything (V2X) system, wherein the transmission configuration information comprises: a transmitting cycle of the VSSB, and a time domain position of a VSSB transmitting time window in the transmitting cycle; and transmit N VSSBs in the VSSB transmitting time window that occurs periodically, according to the transmission configuration information, wherein N is an integer greater than or equal to 1;

wherein each of the VSSBs comprises: a primary sidelink synchronization signal (PSSS), a secondary sidelink synchronization signal (SSSS), a physical sidelink broadcast channel (PSBCH) signal, and a demodulation reference signal (DMRS);

wherein in transmitting the N VSSBs in the VSSB transmitting time window that occurs periodically, the processor is configured to:

determine information of a target carrier frequency for transmitting the VSSBs;

determine a maximum number of time domain resources transmittable for the VSSBs in the VSSB transmitting time window, according to the information of the target carrier frequency;

determine information of valid time domain resources in the VSSB transmitting time window, according to the maximum number of the time domain resources transmittable for the VSSBs and configuration information of uplink and downlink time domain resources sent by a base station; and transmit the VSSBs in the VSSB transmitting time window according to the information of the valid time domain resources.

* * * * *